United States Patent
Yang et al.

(10) Patent No.: US 11,301,897 B2
(45) Date of Patent: Apr. 12, 2022

(54) SECURE VISUAL TRANSACTIONS FOR MOBILE DEVICES

(71) Applicant: Intel Corporation, Santa Clara, CA (US)

(72) Inventors: Shao-Wen Yang, San Jose, CA (US); Ned M. Smith, Beaverton, OR (US); Addicam V. Sanjay, Gilbert, AZ (US); James Quaranta, Jr., San Jose, CA (US); Joshua Ruggiero, Chandler, AZ (US); Jose A. Avalos, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 114 days.

(21) Appl. No.: 16/244,940

(22) Filed: Jan. 10, 2019

(65) Prior Publication Data

US 2019/0318382 A1 Oct. 17, 2019

Related U.S. Application Data

(60) Provisional application No. 62/656,312, filed on Apr. 11, 2018.

(51) Int. Cl.
*G06Q 30/02* (2012.01)
*G06Q 20/32* (2012.01)
(Continued)

(52) U.S. Cl.
CPC ....... *G06Q 30/0255* (2013.01); *G06F 16/955* (2019.01); *G06F 21/53* (2013.01); *G06Q 20/3276* (2013.01); *G06Q 30/0268* (2013.01)

(58) Field of Classification Search
CPC ........... G06Q 30/0255; G06Q 20/3276; G06Q 30/0268
See application file for complete search history.

(56) References Cited

U.S. PATENT DOCUMENTS 8,862,181 B1 * 10/2014 Cope ............... G06Q 20/327
455/556.1
2012/0136796 A1 * 5/2012 Hammad .......... G06Q 20/3674
705/67

(Continued)

FOREIGN PATENT DOCUMENTS

CN 108022097 A 5/2018

OTHER PUBLICATIONS

"Unleashing Premium Entertainment with Hardware-Based content Protection Technology" (Ruan X. (2014) Unleashing Premium Entertainment with Hardware-Based Content Protection Technology. In: Platform Embedded Security Technology Revealed) (Year: 2014).*

(Continued)

*Primary Examiner* — James M Detweiler
(74) *Attorney, Agent, or Firm* — Alliance IP, LLC

(57) ABSTRACT

In one embodiment, an apparatus comprises a display interface to communicate with a display device and a processor. The processor is to: identify a mobile transaction associated with a user, wherein the mobile transaction comprises a potential transaction to be completed using a mobile device of the user; access transaction data associated with the mobile transaction; encrypt the transaction data based on an encryption key associated with the user; generate a visual code associated with the encrypted transaction data, wherein the visual code comprises visually encoded data, and wherein the visual code is generated within a protected execution environment of the processor; establish a protected datapath between the processor and the display device via the display interface; and transmit the visual code to the display device via the protected datapath, wherein the visual code is to be displayed on the display device.

23 Claims, 13 Drawing Sheets

(51) Int. Cl.
*G06F 16/955* (2019.01)
*G06F 21/53* (2013.01)

(56) References Cited

U.S. PATENT DOCUMENTS

| | | | | |
|---|---|---|---|---|
| 2012/0209749 | A1* | 8/2012 | Hammad | G06Q 20/20 |
| | | | | 705/27.1 |
| 2013/0218721 | A1 | 8/2013 | Borhan et al. | |
| 2016/0087949 | A1* | 3/2016 | Deleeuw | H04L 63/061 |
| | | | | 713/170 |
| 2016/0321671 | A1* | 11/2016 | Chandrasekaran | G06Q 20/206 |
| 2017/0178116 | A1* | 6/2017 | Savolainen | G06Q 20/3821 |
| 2017/0256304 | A1* | 9/2017 | Poornachandran | H04L 9/0841 |
| 2018/0330382 | A1* | 11/2018 | Chen | G06Q 20/382 |
| 2018/0349889 | A1* | 12/2018 | Ghosh | G06Q 20/387 |
| 2019/0311343 | A1* | 10/2019 | Cantrell | H04L 9/3297 |

OTHER PUBLICATIONS

Dodson, Ben, et al., "Secure, Consumer-Friendly Web Authentication and Payments with a Phone", Mobile Computing, Applications, and Services Second International ICST Conference (MobiCASE 2010), Santa Clara, CA, USA, Oct. 25-28, 2010, pp. 17-38.

Pollock, Corey, "Introducing Shopcodes: QR Codes That Make Mobile Shopping a Breeze", Shopify Blogs, accessed at: https://www.shopify.in/blog/shopcodes-announcement on Jul. 30, 2018, last updated Sep. 12, 2017, 7 pages.

Suryotrisongko, Hatma, et al., "A Novel Mobile Payment Scheme Based on Secure Quick Response Payment with Minimal Infastructure for Cooperative Enterprise in Developing Countries", International Congress on Interdisciplinary Business and Social Science 2012, Procedia—Social and Behavioral Sciences, vol. 65, Dec. 3, 2012, pp. 906-912.

\* cited by examiner

SECURE VISUAL TRANSACTIONS FOR MOBILE DEVICES

CROSS-REFERENCE TO RELATED APPLICATIONS

This patent application claims the benefit of the filing date of U.S. Provisional Patent Application Ser. No. 62/656,312, filed on Apr. 11, 2018, and entitled "Secure Visual Transactions for Mobile Devices," the content of which is hereby expressly incorporated by reference.

FIELD OF THE SPECIFICATION

This disclosure relates in general to the field of visual computing, and more particularly, though not exclusively, to secure visual transactions for mobile devices.

BACKGROUND

The mobile payment marketplace is continuously expanding. However, security concerns and a general lack of trust have stalled the rate of adoption of mobile payment systems. For example, existing mobile payment systems rely on transmitting sensitive personal and financial information from a user's mobile device to a nearby payment processing device, such as a point-of-sale (POS) terminal. These systems often rely on near-field communication (NFC) technology for sensitive transmissions to POS terminals, which implicates significant security concerns, as both NFC technology and the POS terminals themselves are insecure and prone to hacks.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
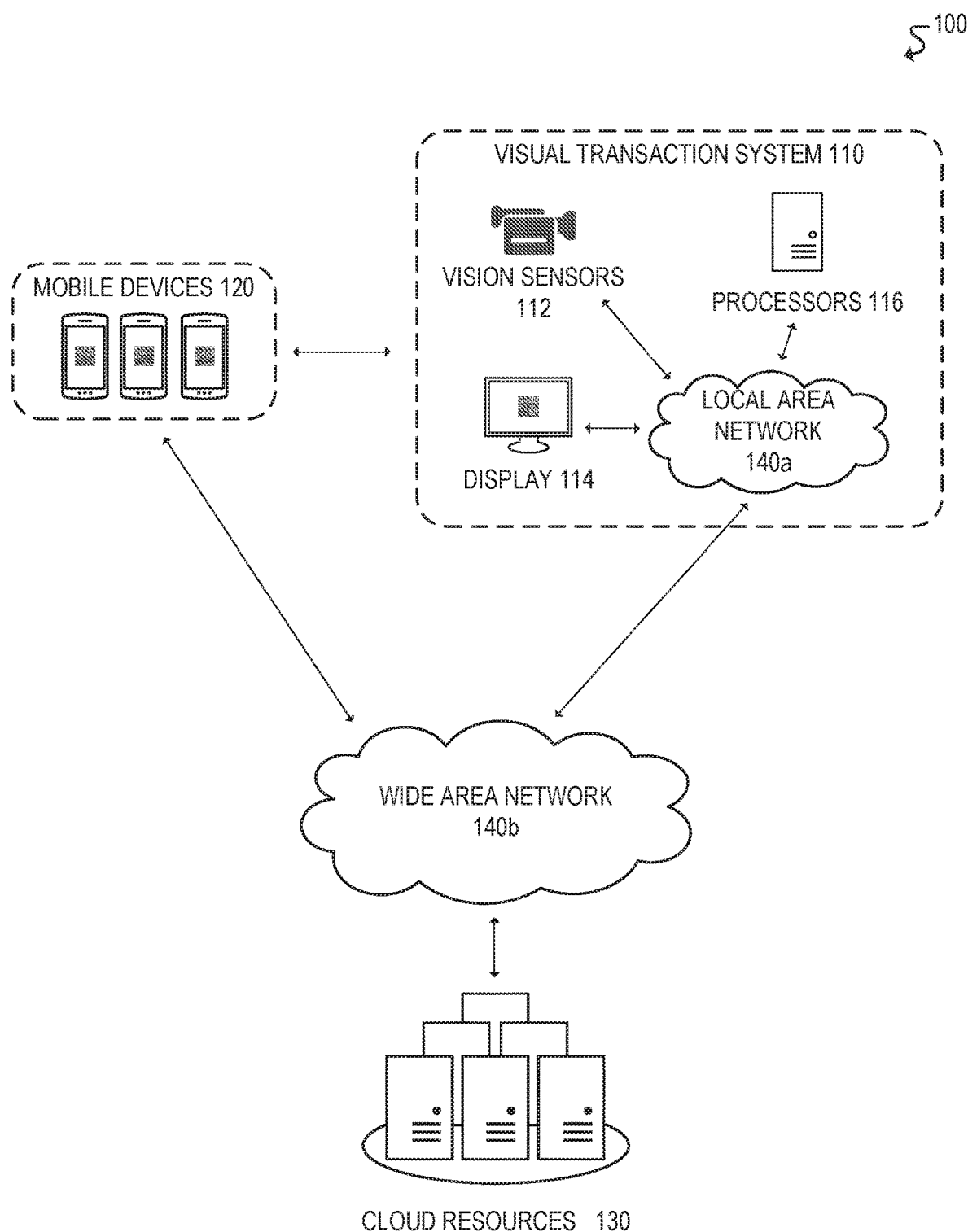
FIG. 1 illustrates an example computing environment for processing secure visual transactions for mobile devices.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Secure Visual Transactions

The mobile payment marketplace is continuing to expand at a rapid pace. For example, over 87% of the U.S. population owns a mobile phone, and the majority of those are smartphones. Further, many mobile phone users make purchases using their mobile devices. For example, nearly one-third of mobile phone users in 2012 reported using mobile devices to make a purchase.

As more merchants implement cardless payment systems, smartphone digital wallets are becoming the ticket to a more streamlined shopping experience. Many new smartphones, tablets, and wearables now have built-in contactless payment systems, which typically use near-field communication (NFC) technology to transmit stored credit and debit card information when brought in close proximity to a retailer's payment terminal, allowing transactions to be completed without fumbling through a physical wallet. In particular, three of the largest NFC-enabled smartphone payment systems were created by Apple, Google, and Samsung. However, they each require their own digital wallet for their respective payment services, and thus are not scalable due to their exclusivity. Further, their reliance on NFC technology implicates significant security concerns, as NFC technology as currently deployed is insecure and prone to hacks.

For example, existing mobile payment systems (e.g., Apple Pay, Google/Android Pay, Samsung Pay, Alipay, LINE pay) rely on transmitting sensitive personal and financial information from a user's mobile device to a nearby payment processing device, such as a point-of-sale (POS) terminal in a retail environment. Many recent attacks impacting the retail industry, however, involve POS terminals that have been penetrated or compromised. Further, POS terminals themselves have become increasingly mobile, and thus often rely on mobile payment services that also may be vulnerable to attack. These security concerns and a general lack of trust have stalled mobile payment adoption.

For example, regarding the lack of trust for mobile payment services, studies show that 56% of U.S. consumers feel that mobile payments increase the chance of fraud and theft. In particular, today's mobile payment services require transmission of a shopper's sensitive personal information. Further, the security of today's mobile payment services depends on having trusted POS terminals, which cannot be guaranteed. For example, today's solutions are rather fragmented, as many or all of them rely on NFC or other derivative technologies that present genuine security risks, particularly from POS terminals that are insecure or untrustworthy. For example, many POS terminals are connected to payment clearing servers using plain old telephone service (POTS) networks and/or unsecured back-haul lines, which may render the POS terminals susceptible to malware attacks. Further, POS terminals are also vulnerable to credit card swiping by dishonest check-out agents, and NFC swiping has emerged as a new form of swiping attack now that tap-n-pay solutions are becoming more prevalent.

Accordingly, this disclosure describes various embodiments that enable mobile devices to perform secure visual transactions. In particular, this disclosure provides an end-to-end (E2E) solution for secure mobile transactions (e.g., secure cardless mobile payments) by leveraging securely displayed immutable universal coding (e.g., barcodes, quick response (QR) codes).

For example, the described embodiments leverage trusted execution environment (TEE) technology (e.g., Intel's Software Guard Extensions (SGX), Intel's Management Engine (ME), and/or secure virtual machines (VMs)) and Protected Audio/Video Path (PAVP) technology to protect sensitive information involved in a mobile or visual transaction. With respect to retail use cases, for example, the described embodiments leverage trusted execution environment (TEE) technology in a shopper's personal device to protect sensitive shopper information (e.g., shopping cart and visual payment information) collected by a trusted display device that is physically located in a retail store. The trusted display device "visually transmits" sensitive shopper information (e.g., visual payment information) to the shopper's personal device using universal coding, and further ensures that all sensitive information is protected by a TEE. In this manner, sensitive shopper information is protected while residing within the trusted display and/or other in-store servers, and it is also protected when it is displayed or "visually transmitted" to the shopper's mobile device.

Accordingly, the described embodiments provide numerous advantages. First, the described embodiments maintain the trust of consumers, as consumers do not have to rely on any modality other than conventional payment methods. For example, by capturing a snapshot of a pre-rendered immutable image (e.g., universal coding such as barcodes or QR codes) on a trusted display using the consumer's mobile device, the consumer will be directed to a specific URL to complete the transaction via the mobile device. Moreover, the authority of a transaction falls back to the conventional authority, such as a bank for financial transactions, which consumers generally trust. Further, the use of visual coding and secure execution environments (e.g., using TEE and/or PAVP technology) improves the security of mobile transactions and protects against traditional attacks. For example, while existing mobile payment services require a shopper's personal information to be transmitted to external POS terminals, the described embodiments ensure that sensitive personal information never leaves the shopper's personal device. Moreover, the use of secure execution environments provides further protection against certain types of attacks, such as framebuffer scraping.

Example embodiments that may be used to implement the features and functionality of this disclosure will now be described with more particular reference to the attached FIGURES.

FIG. 1 illustrates an example computing environment 100 for processing secure visual transactions for mobile devices. In the illustrated embodiment, computing environment 100 includes visual transaction system 110, mobiles devices 120, cloud computing resources 130, and communication networks 140, which are respectively discussed further below.

Visual transaction system 110 enables mobile devices 120 to perform secure visual transactions (e.g., mobile payment transactions). In the illustrated embodiment, visual transaction system 110 includes a plurality of vision sensors 112 (e.g., cameras), one or more display devices 114 (e.g., on premise or in-store communal displays), and one or more processing devices or servers 116 (e.g., on premise or in-store processors or servers). Further, the components of visual transaction system 110 use Local Area Network (LAN) 140a to communicate with each other and/or with other components of computing environment 100 (e.g., via Wide Area Network (WAN) 140b).

In some embodiments, visual transaction system 110 may be deployed on premise of a brick-and-mortar facility, such as a retail store. Moreover, customers or shoppers entering the retail store may use their mobile devices 120 in conjunction with visual transaction system 110 to perform secure visual transactions, such as secure mobile payments. In some embodiments, for example, visual transactions may be implemented using visual coding, such as quick response (QR) codes or other types of barcodes or universal codes. For example, QR codes may be used to communicate sensitive information between visual transaction system 110 and a mobile device 120. In some embodiments, for example, sensitive information may optionally be encrypted and then encoded into a QR code, the QR code may be displayed, and the displayed QR code may then be captured using a camera and subsequently decoded to obtain the sensitive information. For example, in some cases, visual transaction system 110 may generate and display a QR code on a physical display 114, and a mobile device 120 may subsequently capture and decode the displayed QR code (e.g., using a camera on the mobile device). Alternatively, a mobile device 120 may generate and display a QR code on its own screen, and visual transaction system 110 may subsequently capture and decode the displayed QR code (e.g., using vision sensors 112 and/or processing devices 116).

In this manner, QR codes or other types of visual codes may be leveraged to perform secure visual transactions for shoppers in a retail environment. In some embodiments, for example, a shopper's mobile device 120 may initially generate a public-private key pair used for visual transactions, and the mobile device 120 may then "visually transmit" the public key to a visual transaction system 110 in a retail store (e.g., using a QR code). For example, the shopper's mobile device 120 may generate and display a QR code containing the shopper's public key, and that QR code may then be captured or scanned by the vision sensors or cameras 112 of visual transaction system 110.

Visual transaction system 110 may then use the shopper's public key for subsequent visual transactions, such as personalized advertisements and/or check-out interfaces. In some embodiments, for example, visual transaction system 110 may use vision sensors 112 to track various information associated with the shopper, such as shopper identity, demography, trajectory or position in the retail store, shopping history, items currently in the shopper's physical shopping cart, and so forth. In this manner, based on the shopper context, visual transaction system 110 may display personalized advertisements and/or shopper check-out interfaces on a communal display 114 in the retail store.

For example, a targeted advertisement and price may be generated for the shopper based on the shopper identity, demography, and/or shopping history. Alternatively, a check-out interface may be generated for the shopper based on items in the shopper's physical shopping cart (which may be detected and tracked using vision sensors 112). Visual transaction system 110 may then generate a secure QR code that can be used to purchase the associated product(s) or service(s). For example, information associated with the transaction (e.g., shopper identity, product information, seller or payee information, and so forth) may first be encrypted using the shopper's public key and/or a separate symmetric key. The encrypted transaction information may then be encoded into a QR code directly, or alternatively, the encrypted transaction information may be stored on an in-store server 116 and a URL to the in-store server may be encoded into the QR code.

In this manner, the personalized advertisement or checkout interface, along with the associated QR code, can then be securely displayed on the communal display 114, allowing the shopper to purchase the advertised product or service seamlessly using their mobile device 120. For example, the camera of the shopper's mobile device 120 can capture a snapshot of the QR code, and the mobile device 120 can then decode and process the transaction information encoded in the QR code, which may identify the products, sellers, and payees involved in the transaction. The remainder of the purchase transaction can then be completed on the shopper's mobile device 120 using conventional online purchasing methods (e.g., paying the seller or payee using online debit/credit card processing). In some cases, for example, the shopper's mobile device 120 may submit payment to an e-commerce or banking service (e.g., located remotely over a network 140b and/or in the cloud 130).

The security of mobile transactions implemented using QR codes (or other types of visual coding), however, depends on the ability to protect the QR codes from being maliciously altered or modified. Accordingly, in some embodiments, QR codes may be generated and displayed in a secure manner that renders them immutable, thus ensuring that the transaction information encoded in the QR codes (e.g., product/seller/payee information) remains intact and untampered. In this manner, mobile transactions that leverage QR codes can be protected against certain types of attacks, such as malware attacks that attempt to alter QR codes in order to trick mobile devices into performing fraudulent transactions. For example, as described further throughout this disclosure (e.g., in connection with FIG. 5), certain embodiments may leverage trusted execution environment (TEE) technology and/or protected I/O technology to protect QR codes from malicious tampering, both while the QR codes are being generated and when they are subsequently displayed.

Mobile devices 120 may include any type of mobile or portable devices capable of interacting within computing environment 100, such as mobile phones, tablets, and wearable devices (e.g., smart watches, smart glasses), among other examples.

Cloud computing resources 130 may include any resources or services that are hosted remotely over a network, which may otherwise be referred to as in the "cloud." In some embodiments, for example, cloud resources 130 may be remotely hosted on servers in a datacenter (e.g., application servers, database servers). In general, cloud resources 130 may include any resources, services, and/or functionality that can be utilized by or for components of computing environment 100, such as visual transaction system 110 and/or mobile devices 120.

Communication networks 140a,b may be used to facilitate communication between components of computing environment 100. In the illustrated embodiment, for example, components of visual transaction system 110 are connected to local area network (LAN) 140a in order to facilitate communication with each other and/or other remote networks or resources, such as wide area network (WAN) 140b and/or cloud resources 130. In various embodiments, computing environment 100 may be implemented using any number or type of communication network(s) 140, including local area networks, wide area networks, public networks, the Internet, cellular networks, Wi-Fi networks, short-range networks (e.g., Bluetooth or ZigBee), and/or any other wired or wireless communication networks or mediums.

Any, all, or some of the computing devices of computing environment 100 may be adapted to execute any operating system, including Linux or other UNIX-based operating systems, Microsoft Windows, Windows Server, MacOS, Apple iOS, Google Android, or any customized and/or proprietary operating system, along with virtual machines adapted to virtualize execution of a particular operating system.

While FIG. 1 is described as containing or being associated with a plurality of elements, not all elements illustrated within computing environment 100 of FIG. 1 may be utilized in each alternative implementation of the present disclosure. Additionally, one or more of the elements described in connection with the examples of FIG. 1 may be located external to computing environment 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Additional embodiments associated with the implementation of computing environment 100 are described further in connection with the remaining FIGURES. Accordingly, it should be appreciated that computing environment 100 of FIG. 1 may be implemented with any aspects of the embodiments described throughout this disclosure.

Figure 2:
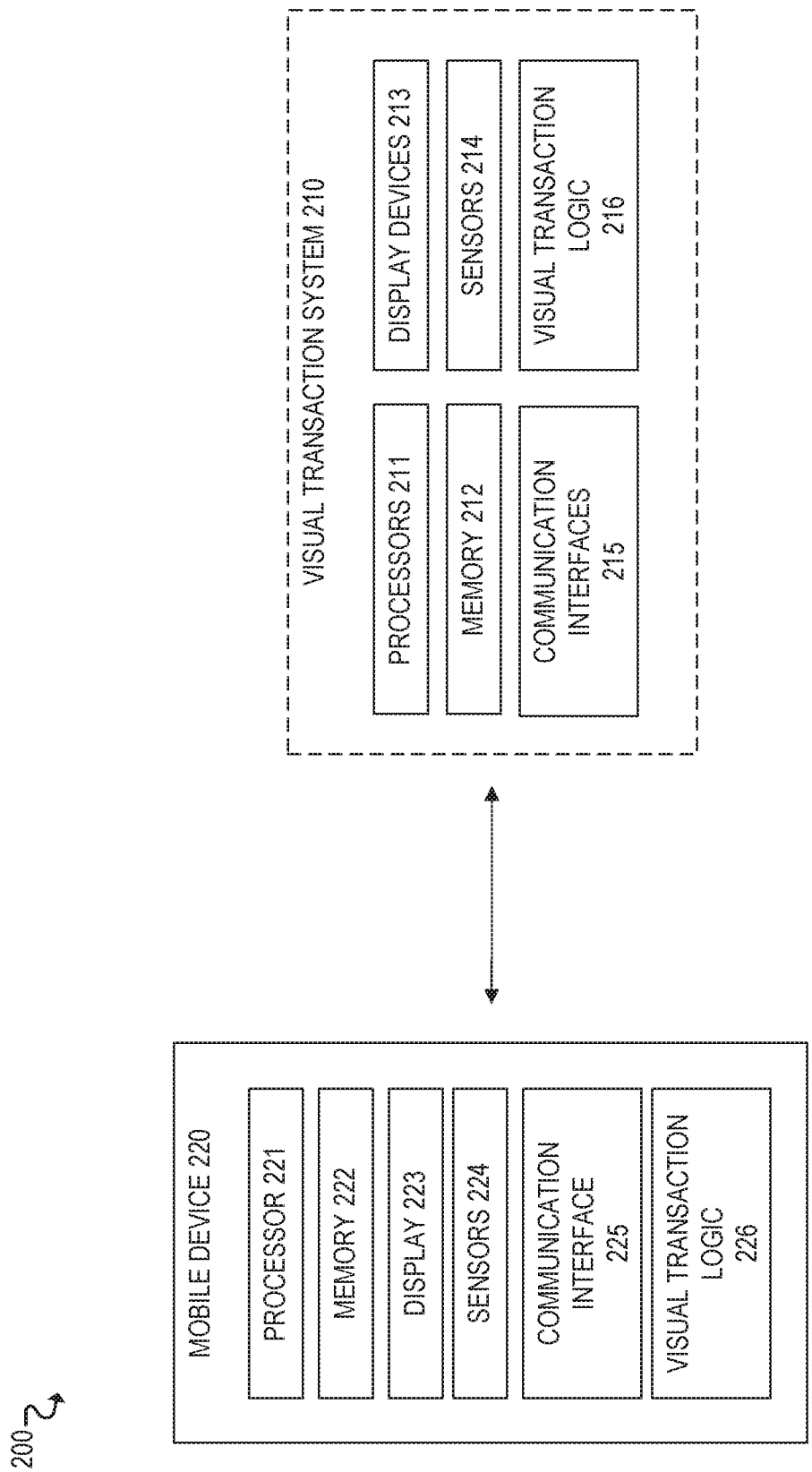
FIG. 2 illustrates an example embodiment of a secure visual transaction system for mobile devices.

FIG. 2 illustrates an example embodiment of a secure visual transaction system 200 for mobile devices. In some embodiments, for example, the components of secure visual transaction system 200 may be used to implement the visual transaction and processing functionality described throughout this disclosure.

The illustrated embodiment includes a visual transaction system 210 and a mobile device 220. The visual transaction system 210 includes one or more processors 211, one or more memory elements 212, one or more display devices 213, one or more sensors 214 (e.g., cameras and/or vision sensors), one or more communication interfaces 215, and visual transaction logic 216. In various embodiments, the underlying components and functionality of visual transaction system 210 may be integrated within and/or distributed across any number of devices or components. Moreover, the mobile device 220 includes one or more processors 221, one or more memory elements 222, a display 223, one or more sensors 224 (e.g., a camera), one or more communication interfaces 225, and visual transaction logic 226.

Further, the respective components of visual transaction system 210 and mobile device 220 may be used to implement the secure visual transaction and processing functionality described throughout this disclosure.

FIGS. 3-6 illustrate an example retail shopping use case that leverages secure visual transactions. While the illustrated example uses quick response (QR) codes to implement the secure visual transactions, other embodiments may use any type of barcode or visual coding, such as linear barcodes, matrix barcodes (e.g., Digimarc), and so forth.

The illustrated use case involves the following stages: (1) shopper identity registration and discovery using a communal display; (2) secure generation and display of ads and immutable QR codes on the communal display based on shopper context; (3) extraction of purchase information by scanning displayed QR codes using a shopper's mobile device; and (4) transaction processing on the shopper's mobile device to complete a purchase (e.g., using online debit/credit card processing).

Figure 3:
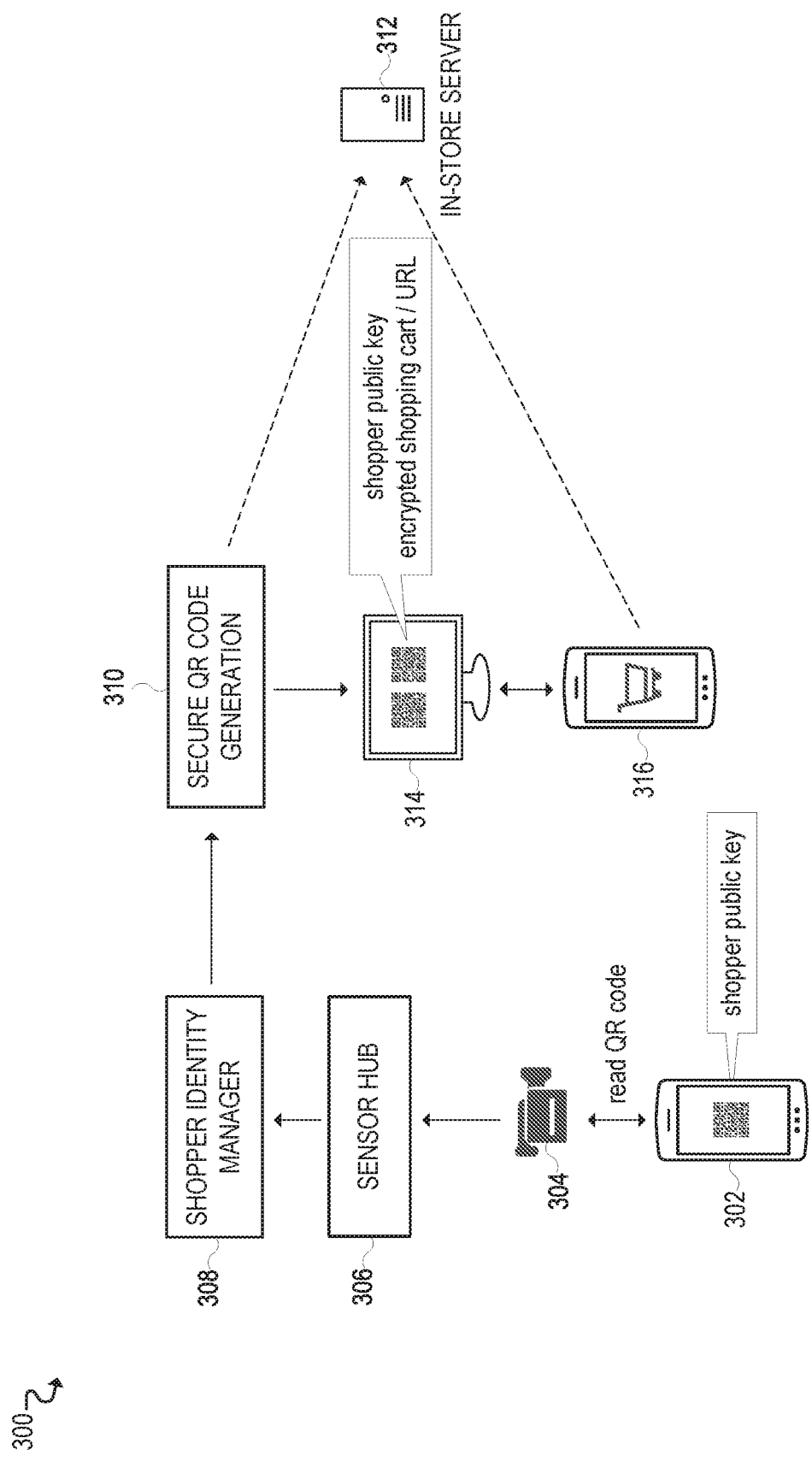
FIGS. 3, 4, 5, and 6 illustrate an example retail shopping use case that leverages secure visual transactions.

FIG. 3 illustrates a control flow 300 for shopper identity registration and discovery using a communal display. In the illustrated example, the control flow begins with shopper identity registration. For example, a shopper may first generate a Rivest-Shamir-Adleman (RSA) key pair used during the shopping experience, where the public key is used to identify the shopper and encrypt shopping cart contents to the shopper's mobile device. The public key may be disclosed to the retailer by generating an associated QR code that is displayed on the screen of the shopper's mobile device (block 302), which is then captured by an in-store camera system (block 304).

The snapshot of the QR code containing the shopper's public key is then obtained by a sensor hub associated with the camera system (block 306) and further provided to a shopper identity manager (block 308). The shopper's identity and shopping context (e.g., shopping cart information) may then be identified by extracting the public key from the QR code and converting it into a key identifier, such as a key fingerprint that is generated using a cryptographic hash algorithm on the public key (e.g., KeyID=SHA256(public_key)).

When the time comes for the shopper to checkout, the shopping cart contents are encrypted using the shopper's public key, either alone or in combination with other encryption keys or methods. In various embodiments, for example, the shopping cart may be encrypted directly using the shopper's public key, or the shopping cart may be encrypted using a separate symmetric key and that symmetric key may then be encrypted using the shopper's public key.

Figure 4:
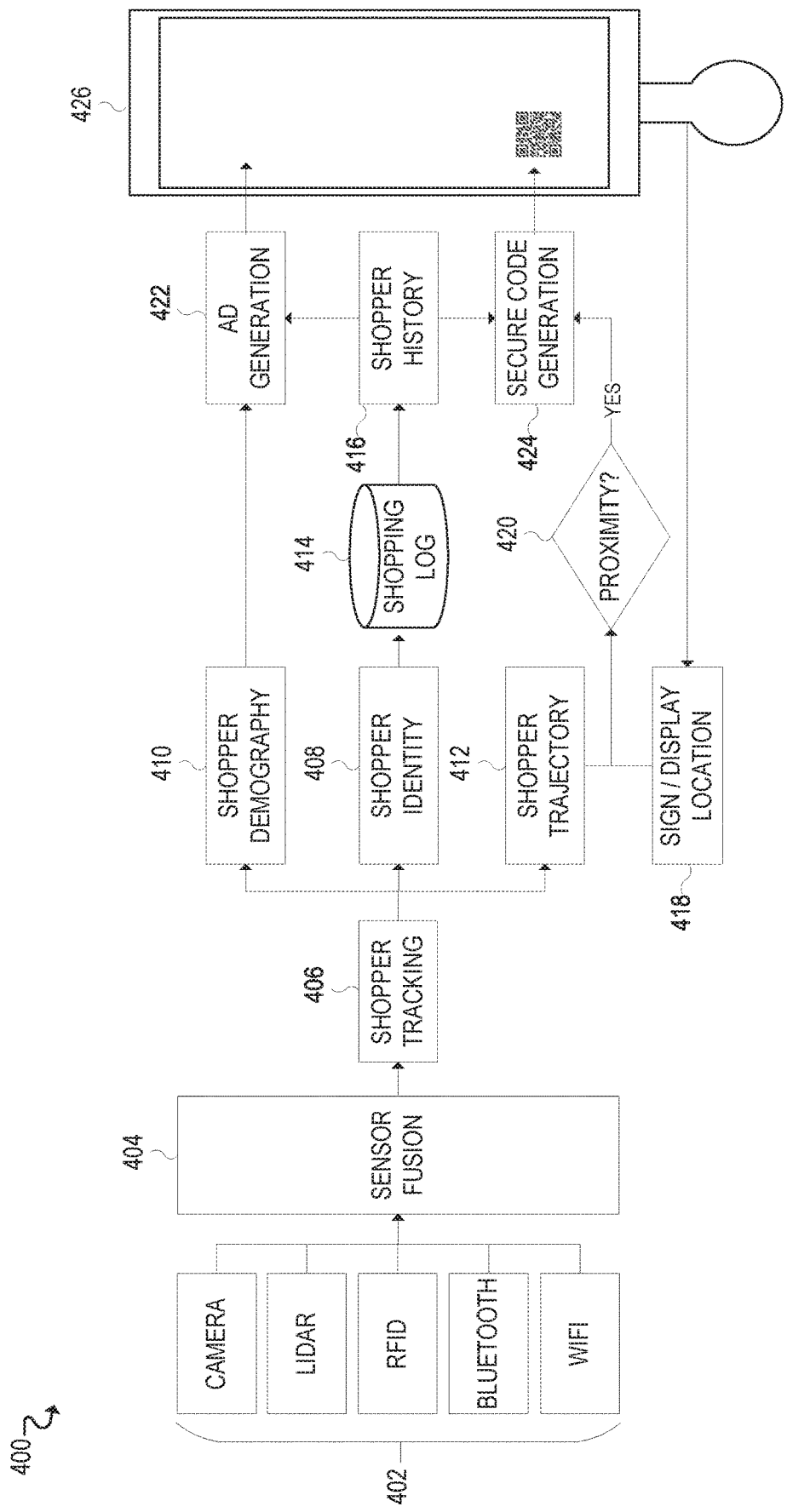
Figure 5:
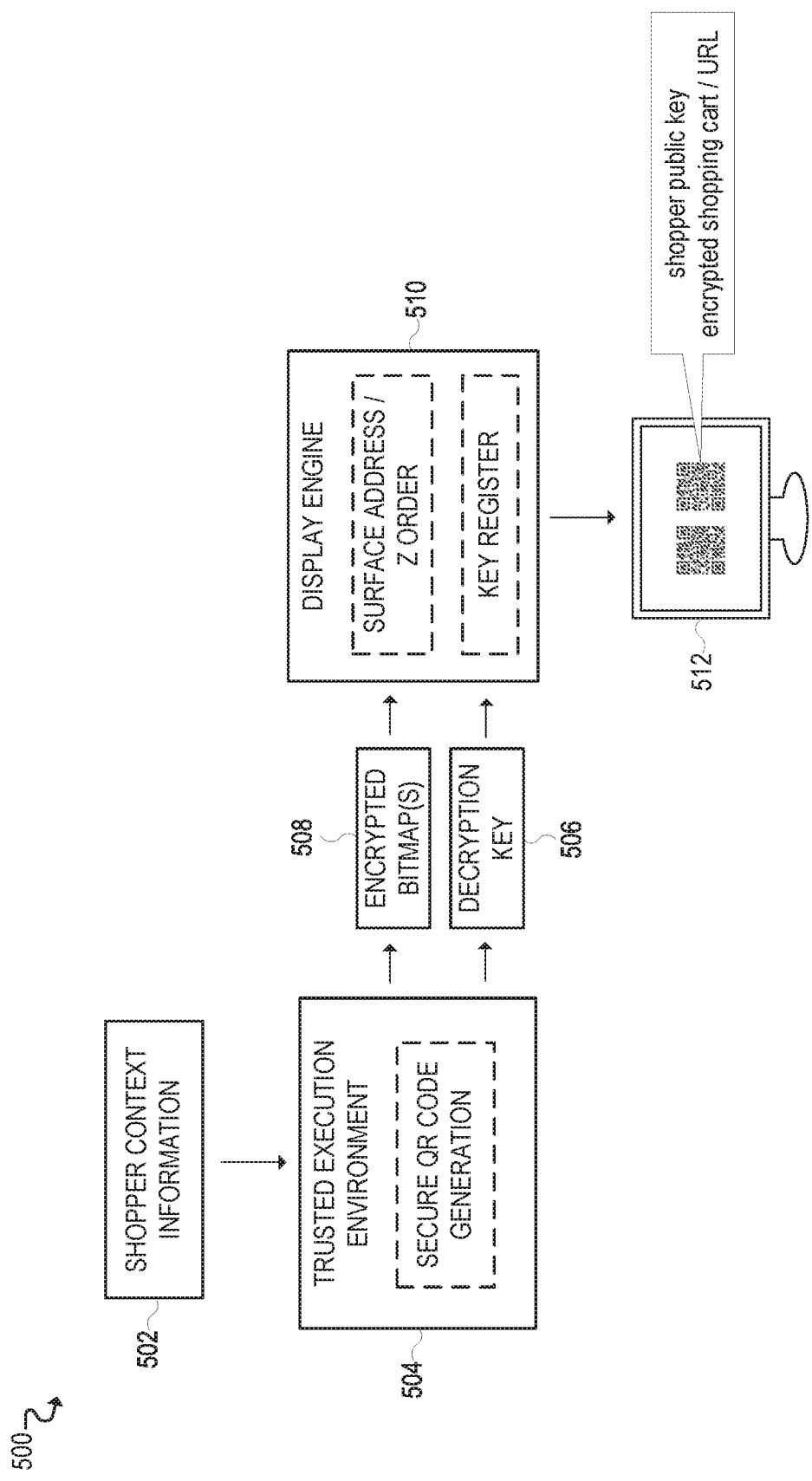

The key identifier, along with either the actual encrypted shopping cart contents or otherwise a URL to an in-store server that contains the encrypted shopping cart contents, are then converted into one or more QR codes (block 310) that are securely displayed on a communal display device in the retail store (block 314), as described further in connection with FIGS. 4 and 5. In various embodiments, for example, the encrypted shopping cart contents may be encoded into a QR code directly, or the encrypted shopping cart contents may be transmitted to an in-store server (block 312) and a URL to the in-store server may be encoded into the QR code. Further, in various embodiments, this information may be encoded using multiple QR codes or alternatively combined into a single code for simpler decoding.

The shopper then reads the QR code(s) from the communal display using the camera on the shopper's mobile device (block 316). If the QR code(s) encode a URL to an in-store server containing the encrypted shopping cart contents, the shopper's mobile device uses that URL to download the encrypted shopping cart contents. Otherwise, the encrypted shopping cart contents are decoded directly from the QR code(s).

The encrypted shopping cart is then decrypted by the shopper's mobile device. For example, in various embodiments, the encrypted shopping cart may be decrypted directly using the shopper's public key, or it may be decrypted using a symmetric key that must first be unwrapped or decrypted using the shopper's public key. Once decrypted, the shopping cart is available for final checkout and payment using one of the payment options programmed into the shopper's mobile device (e.g. Samsung Pay, Google Pay, Apple Pay, AliPay, credit or debit cards, and so forth).

This method protects privacy sensitive shopper information as it crosses the air gap between the TEE of the communal display device and/or in-store server and the shopper's mobile device. Further, the shopper may generate a different public/private key pair for each visit to a retail store to avoid correlation attacks based on shopper behavior (e.g., either by a single retailer or multiple colluding retailers). Further, in some embodiments, the TEE may also verify that the public key found in the QR code matches a private key stored in the TEE. If they don't match, then it potentially could be an attacker key pair (e.g. installed by malicious malware or adware) that the user wishes not to interact with.

FIG. 4 illustrates a control flow 400 for secure generation and display of advertisements and immutable QR codes on a communal display. In some embodiments, for example, personalized advertisements and secure QR codes may be generated and displayed on a communal display in a retail environment based on shopper context (e.g., shopper identity, demography, shopping history, in-store trajectory or position), as described further below.

In the illustrated example, the control flow begins by collecting data associated with a shopper using various sensors and/or wireless technologies (block 402), including cameras, Light Detection and Ranging (LIDAR), Radio-Frequency Identification (RFID), Bluetooth, Wi-Fi, and so forth. The collective sensor data may then be fused or processed (block 404) in order to track the shopper (block 406). For example, the shopper identity (block 408), demography (block 410), and/or trajectory or position in the retail environment (block 412) may be determined based on the fused sensor data. Similarly, items in the shopper's physical shopping cart may be tracked based on the fused sensor data. Moreover, the shopper identity may be used to maintain a shopping log (block 414) containing the shopping history of the shopper (block 416).

Further, in some embodiments, the shopper position or trajectory (block 412), in conjunction with the known locations of any communal displays or signage (block 418) in the retail environment, may be used to determine when the shopper is within the proximity of a communal display (block 420). In this manner, when the shopper is near a communal display, personalized advertisements or check-out interfaces may be displayed on the communal display based on the shopper context.

For example, a targeted advertisement and associated price may be generated for the shopper (block 422) based on the shopper identity, demography, and/or shopping history. Alternatively, a check-out interface may be generated for the shopper based on tracked items in the shopper's physical shopping cart (e.g., as determined using the fused sensor data 404). Further, a secure QR code that can be used to purchase the particular product(s) or service(s) may also be generated (block 424), as described further throughout this disclosure. For example, the secure QR code may encode information associated with an advertised product and its seller.

The personalized advertisement and associated QR code can then be securely displayed on the communal display (block 426), allowing the shopper to purchase the advertised product or service seamlessly using their mobile device. For example, the camera of the shopper's mobile device can capture a snapshot of the QR code, and the mobile device can then process the transaction information encoded in the QR code in the manner described throughout this disclosure.

FIG. 5 illustrates a control flow 500 for secure generation and display of QR codes. In particular, the security of mobile transactions implemented using QR codes (or other types of visual coding) depends on the ability to protect the QR codes from being maliciously altered or modified. Accordingly, the illustrated example provides an approach for generating and displaying QR codes in a secure manner that renders them immutable, thus ensuring that the transaction information encoded in the QR codes (e.g., product/seller/payee information) remains intact and untampered. In this manner, mobile transactions that leverage QR codes can be protected against certain types of attacks, such as malware attacks that attempt to alter QR codes in order to trick mobile devices into performing fraudulent transactions.

The illustrated example leverages trusted execution environment (TEE) technology (e.g., Intel's Software Guard Extensions (SGX), Intel's Management Engine (ME), and/or secure virtual machines (VMs)) and Protected Audio/Video Path (PAVP) technology to protect QR codes from malicious tampering. In this manner, the resulting protection prevents QR codes from being tampered with during both the generation phase and the display phase.

In the illustrated example, the control flow begins by providing shopper context information 502 to a secure enclave or trusted execution environment (TEE) 504. The shopper context information may include a variety of information associated with a shopper that can be used to generate a QR code for a personalized retail transaction, such as the shopper identity and public key, shopping history, shopper location or trajectory, targeted shopper advertisements and price offerings, and so forth.

Moreover, the secure enclave or TEE 504 may provide a protected, isolated, and/or encrypted execution environment in a processor that protects the integrity of code and data executed within the protected environment. In some embodiments, for example, the secure enclave or TEE may be implemented using various technologies provided by Intel processors and/or other types of processors, such as Intel's Management Engine (ME), Dynamic Application Loader (DAL), Software Guard Extensions (SGX), and/or Virtualization (VTX) Containers, secure Virtual Machines (VMs), ARM TrustZone technology, and so forth. In this manner, a QR code can be generated using the shopper context information from within the secure enclave or TEE 504, thus ensuring the integrity of the resulting QR code.

The TEE may further implement a secure path for transmission of the resulting QR code to a display engine 510 that will ultimately be used to display the QR code on a physical display 512. For example, the resulting bitmap for the QR code generated in the TEE may first be encrypted using a shared secret or key 506 that is established between the TEE and the display engine, and the encrypted bitmap 508 may then be transmitted from the TEE to the display engine.

In some embodiments, for example, the secure path between the TEE and the display engine may be implemented using Intel's Protected Audio Video Path (PAVP) technology. For example, Intel PAVP technology may be used to establish a shared secret or key between the Intel ME and Intel GFX engine (e.g., integrated graphics), which can be used by the Intel ME to encrypt the QR code bitmap prior to transmission to the Intel GFX engine, and can further be used by the Intel GFX engine to decrypt the encrypted QR code bitmap after receipt from the Intel ME.

Moreover, in some embodiments, an out-of-band process may be used to establish the shared secret or key between the TEE to the display engine. For example, using an out-of-band process, a bitmap decryption key may be communicated from the TEE to a key register in the display engine. In some embodiments, this may be accomplished during system boot up and initial configuration using the Basic Input/Output System (BIOS), or it may occur over a PAVP or Sigma session prior to encryption/decryption of the QR code bitmap.

Further, if there are multiple QR code bitmaps, they may either be encrypted separately or otherwise combined into a manifest or package (e.g., using Clear Bundles or Red Hat Packages) that is subsequently encrypted and delivered.

Accordingly, in the illustrated example, a QR code can be generated using the shopper context information from within the secure enclave or TEE 504, thus ensuring the integrity of the resulting QR code bitmap. The QR code bitmap can then be encrypted in the TEE 504 using the established trusted-path encryption key 506, and the encrypted QR code bitmap 508 can then be delivered to the display engine 510, where it is decrypted and ultimately displayed on a physical device 512.

In this manner, the described approach can be used by an in-store display device to ensure that sensitive shopper information (e.g., shopping cart, payment, and/or personal information) is protected from malware by (1) performing the QR code generation step within a trusted execution environment (TEE); and (2) using a secure path to transmit the resulting QR code bitmap to the display engine of the in-store display.

A similar secure approach can be used by a shopper's mobile device when generating and/or displaying QR codes, such as the QR code containing the shopper's public key, which is initially generated and displayed on the shopper's mobile device and subsequently captured by the in-store camera or surveillance system. For example, the QR code containing the shopper's public key can be generated in a TEE on the shopper's mobile device and then securely displayed on the screen of the mobile device via a secure path between the TEE and display engine of the mobile device.

Further, the described approach can be used for secure generation and display of any type of visual coding (e.g., beyond QR codes) and for any use case (e.g., beyond the retail context).

Figure 6:
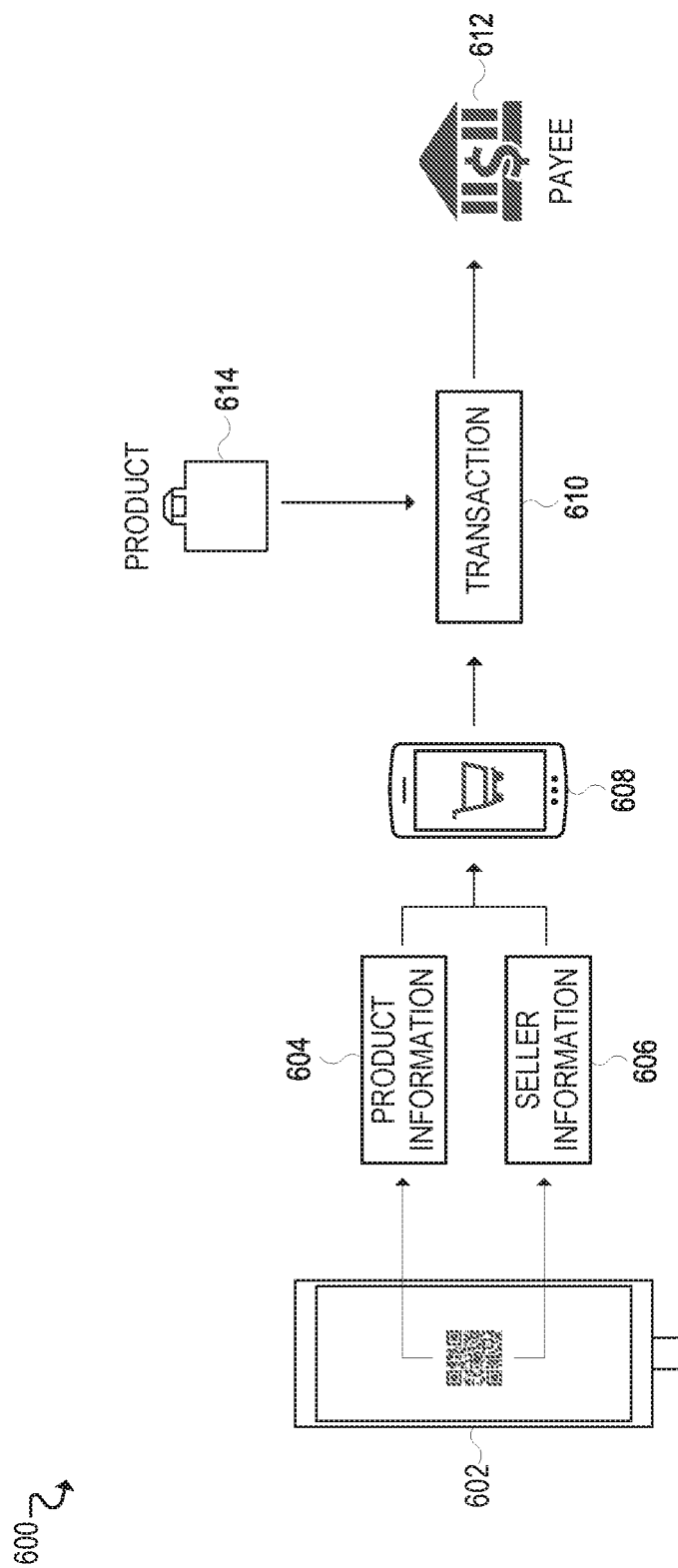

FIG. 6 illustrates a control flow 600 for extracting purchase information from a displayed QR code and completing an associated purchase on a shopper's mobile device. For example, once a secure QR code is presented on the screen of a communal display (block 602), a shopper can simply take a picture of the QR code using the camera on their mobile device, and the QR code can be decoded to extract product information (block 604) and seller/payee information (block 606) onto the shopper's mobile device (block 608). The remainder of the purchase transaction (block 610) can then be completed on the shopper's mobile device using conventional online purchasing methods, such as by paying the seller or payee using online debit/credit card processing (block 612) in exchange for the product itself (block 614).

In this manner, the retail use case described in connection with FIGS. 3-6 provides a secure payment method for retail shoppers with the added advantage of trust, authority, and security for secure cardless payments. For example, the solution leverages shopper context to deliver the best possible advertisements, products, and shopping experience to retail shoppers. Further, shoppers can leverage the secure visual payment mechanism to purchase products of interest without the risk of theft of their sensitive personal information.

Figure 7:
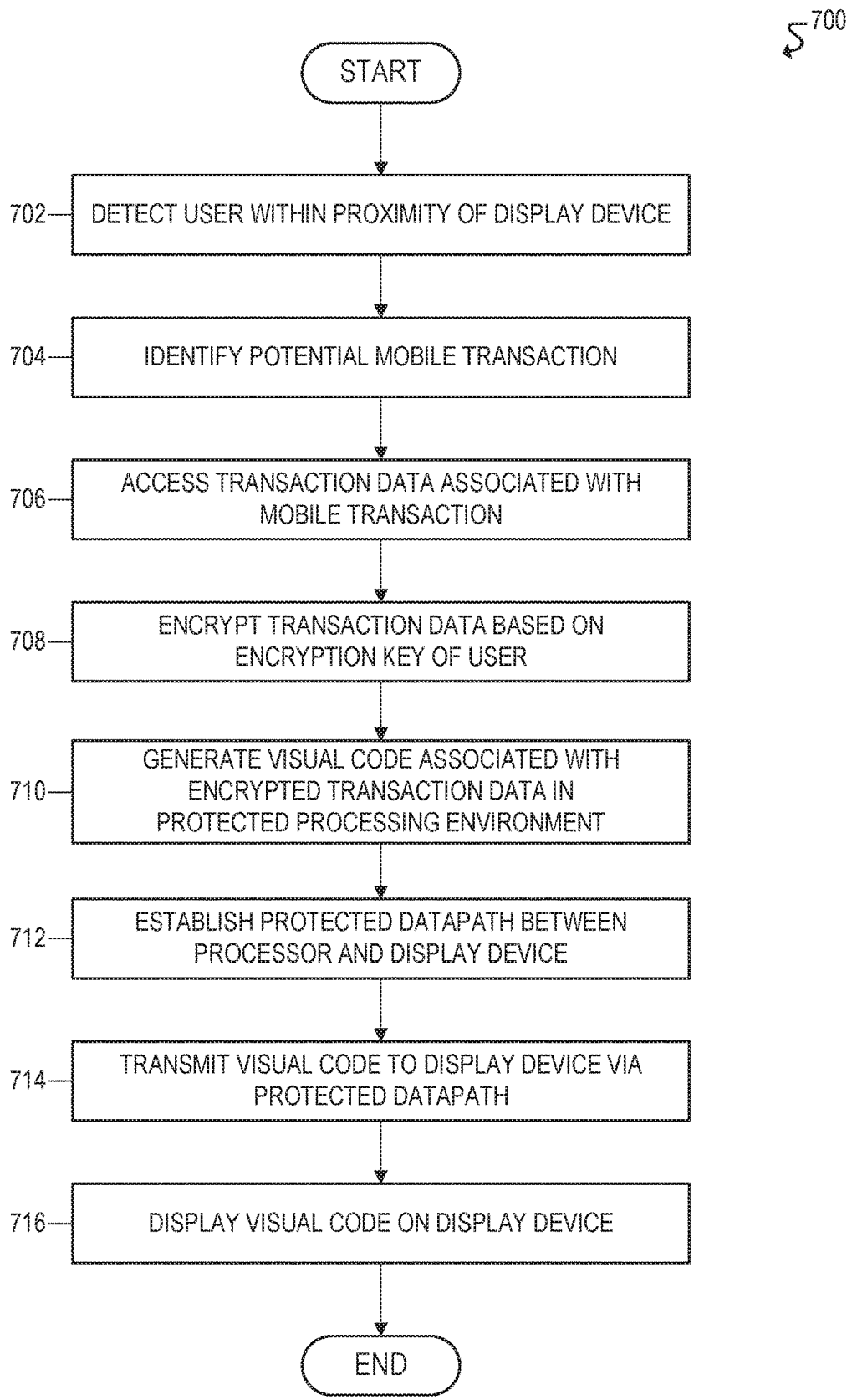
FIG. 7 illustrates a flowchart for an example embodiment of secure visual transaction processing.

FIG. 7 illustrates a flowchart 700 for an example embodiment of secure visual transaction processing. In some embodiments, for example, flowchart 700 may be implemented using the embodiments and functionality described throughout this disclosure.

The flowchart may begin at block 702, where a user is detected within the proximity of a display device. In some embodiments, for example, the user's presence near the display device may be detected based on visual data captured by one or more vision sensors deployed near the display device. In the retail context, for example, a shopper may be detected near a digital display (e.g., a digital sign, kiosk, and/or terminal) in a retail store or environment based on cameras deployed nearby.

The flowchart may then proceed to block 704, where a mobile transaction associated with the user is identified. The mobile transaction, for example, may be a potential transaction or offer to present to the user that can optionally be completed via a mobile device associated with the user. In the retail context, for example, a shopper may be identified, monitored, and/or tracked using vision sensors, and potential purchase transactions for the shopper may be identified based on the context of the shopper (e.g., targeted product advertisements, check-out transactions for items detected in a physical shopping cart or basket, and so forth). In some embodiments, for example, the shopper context may be based on any of the following types of information: shopper identity, demography, purchase history, current position within the retail environment, current contents of a physical or virtual shopping cart, and so forth. In this manner, based on the shopper context, a targeted advertisement may be selected for presentation to the shopper, or a check-out interface may be prepared based on the items in the shopper's physical or virtual shopping cart.

The flowchart may then proceed to block 706, where transaction data associated with the mobile transaction is accessed, obtained, and/or generated. The transaction data, for example, may include any data associated with completing the transaction, such as the product(s) to be purchased, cost, buyer and seller identities, payment information, and so forth.

The flowchart may then proceed to block 708, where the transaction data is encrypted based on an encryption key associated with the user. In some embodiments, for example, the encryption key may be a public key associated with a public-private key pair generated for the user. Moreover, in some embodiments, the encryption key may be obtained from, or provided by, the mobile device of the user (e.g., via wireless transmission or using a visual transaction). In the retail context, for example, a shopper's mobile device may generate and display a visual code (e.g., a QR code) containing a visual encoding of the shopper's public key, and the vision sensors within the retail environment may scan or capture the visual code displayed by the mobile device. In this manner, the shopper's public key can then be extracted by decoding the visual code, and the transaction data can subsequently be encrypted based on the shopper's public key.

The flowchart may then proceed to block 710, where a visual code (e.g., a QR code) associated with the encrypted transaction data is generated in a protected processing environment.

The visual code, for example, may contain visually encoded data associated with the encrypted transaction data, such as a visual representation or encoding of the encrypted transaction data itself and/or other associated data. In some embodiments, for example, the visual code may encode the encrypted transaction data directly (and/or other associated data), or alternatively, the visual code may encode a URL that can be used to download the encrypted transaction data. For example, in some embodiments, the encrypted transaction data may be stored at a network location accessible by the user's mobile device (e.g., an in-store server), and the URL to the network location may then be encoded into the visual code.

Further, in some embodiments, the visual code may be generated in a protected, encrypted, and/or trusted execution environment of a processor, thus protecting the visual code from any potentially malicious tampering during generation.

The flowchart may then proceed to block 712, where a protected datapath is established between the processor and the display device. In some embodiments, for example, the protected datapath may be established via an input/output (I/O) interface (e.g., a display interface) between the processor and the display device, and an encryption key may be negotiated to encrypt transmissions sent via the protected datapath.

The flowchart may then proceed to block 714, where the visual code is transmitted to the display device via the protected datapath. In some embodiments, for example, the processor may encrypt the visual code using the encryption key negotiated for the protected datapath, and the processor may then transmit the encrypted visual code to the display device via the protected data path.

The flowchart may then proceed to block 716, where the visual code is then displayed on the display device. In some embodiments, for example, the encrypted visual code may be received via the protected datapath and subsequently decrypted using the negotiated encryption key (e.g., by a display driver or engine), and the decrypted visual code may then be displayed on the display device.

In this manner, the visual code is securely generated and displayed using an approach that renders the visual code immutable throughout the entire process, thus ensuring that the visual code is not maliciously tampered with. For example, the visual code is generated in a protected or secure processing environment, and the visual code is then provided to a physical display using protected input/output (I/O) technology (e.g., via a protected datapath). Thus, the visual code cannot be tampered with during either the generation process or the display process.

Accordingly, a user can then safely scan or capture the visual code from the physical display using the camera on the user's mobile device (e.g., by taking a camera snapshot of the visual code on the physical display). The user's mobile device can then extract the encoded data from the visual code, obtain the encrypted transaction data based on the decoded data (e.g., either directly or via a URL), and then decrypt the encrypted transaction data. The decrypted transaction data can then be used to complete the transaction on the user's mobile device in a safe and secure manner.

At this point, the flowchart may be complete. In some embodiments, however, the flowchart may restart and/or certain blocks may be repeated. For example, in some embodiments, the flowchart may restart at block 702 to continue detecting users and processing mobile and/or visual transactions associated with those users.

Example Internet-of-Things (IoT) Implementations

FIGS. 8-11 illustrate examples of Internet-of-Things (IoT) networks and devices that can be used in accordance with embodiments disclosed herein. For example, the operations and functionality described throughout this disclosure may be embodied by an IoT device or machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
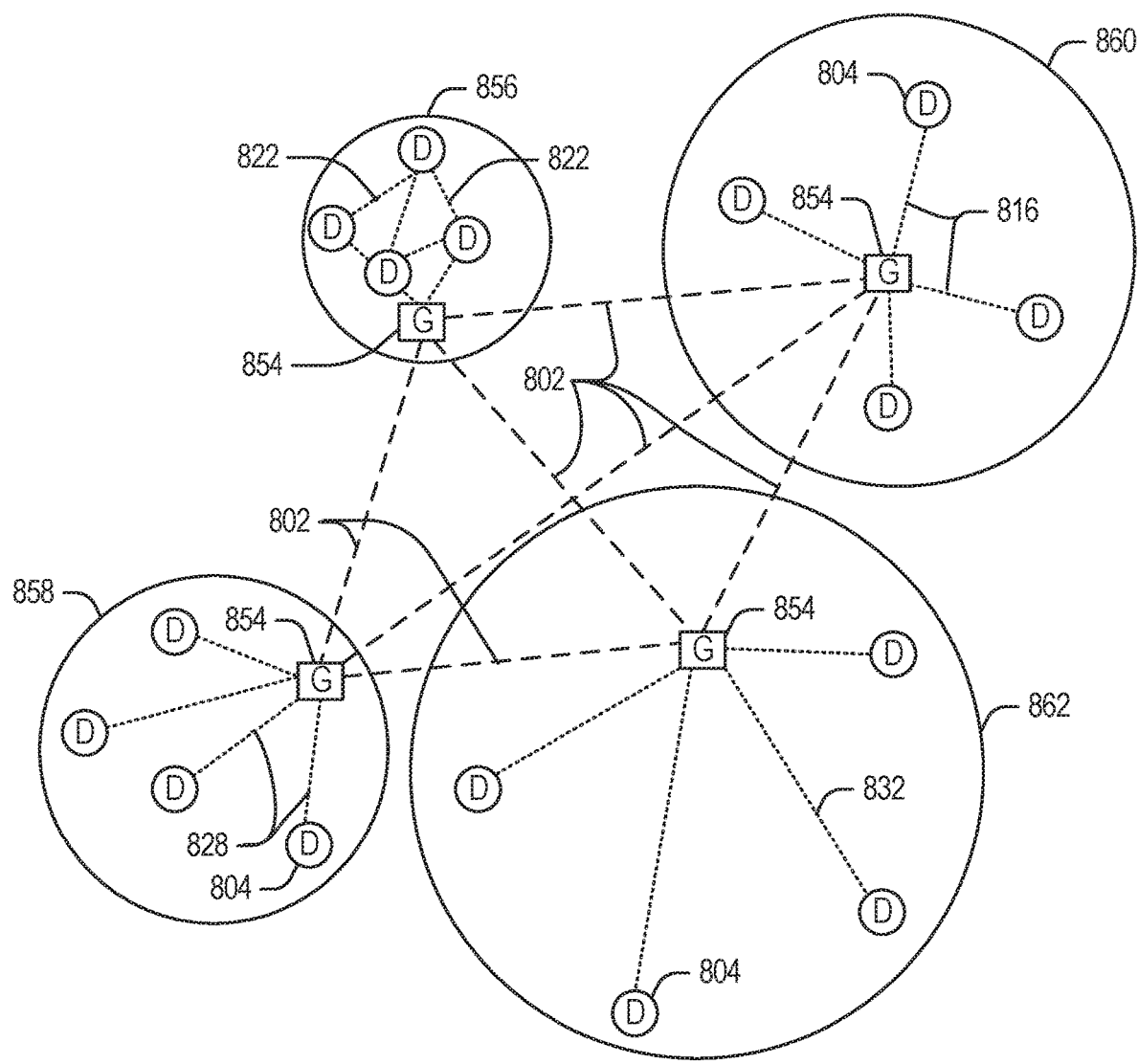
FIGS. 8, 9, 10, and 11 illustrate examples of Internet-of-Things (IoT) networks and architectures that can be used in accordance with certain embodiments.

FIG. 8 illustrates an example domain topology for respective internet-of-things (IoT) networks coupled through links to respective gateways. The internet of things (IoT) is a concept in which a large number of computing devices are interconnected to each other and to the Internet to provide functionality and data acquisition at very low levels. Thus, as used herein, an IoT device may include a semiautonomous device performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as those introduced in FIGS. 8-11, present a number of new challenges in a heterogeneous network of connectivity comprising a combination of wired and wireless technologies.

FIG. 8 specifically provides a simplified drawing of a domain topology that may be used for a number of internet-of-things (IoT) networks comprising IoT devices 804, with the IoT networks 856, 858, 860, 862, coupled through backbone links 802 to respective gateways 854. For example, a number of IoT devices 804 may communicate with a gateway 854, and with each other through the gateway 854. To simplify the drawing, not every IoT device 804, or communications link (e.g., link 816, 822, 828, or 832) is labeled. The backbone links 802 may include any number of wired or wireless technologies, including optical networks, and may be part of a local area network (LAN), a wide area network (WAN), or the Internet. Additionally, such communication links facilitate optical signal paths among both IoT devices 804 and gateways 854, including the use of MUXing/deMUXing components that facilitate interconnection of the various devices.

The network topology may include any number of types of IoT networks, such as a mesh network provided with the network 856 using Bluetooth low energy (BLE) links 822. Other types of IoT networks that may be present include a wireless local area network (WLAN) network 858 used to communicate with IoT devices 804 through IEEE 802.11 (Wi-Fi®) links 828, a cellular network 860 used to communicate with IoT devices 804 through an LTE/LTE-A (4G) or 5G cellular network, and a low-power wide area (LPWA) network 862, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 804, such as over the backbone links 802, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 856, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 858, for instance, may use systems that perform standards conversion to provide multi-standard connectivity, enabling IoT devices 804 using different protocols to communicate. Further systems may provide seamless interconnectivity across a multi-standard infrastructure comprising visible Internet resources and hidden Internet resources.

Communications in the cellular network 860, for instance, may be enhanced by systems that offload data, extend communications to more remote devices, or both. The LPWA network 862 may include systems that perform non-Internet protocol (IP) to IP interconnections, addressing, and routing. Further, each of the IoT devices 804 may include the appropriate transceiver for wide area communications with that device. Further, each IoT device 804 may include other transceivers for communications using additional protocols and frequencies.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 9 below.

Figure 9:
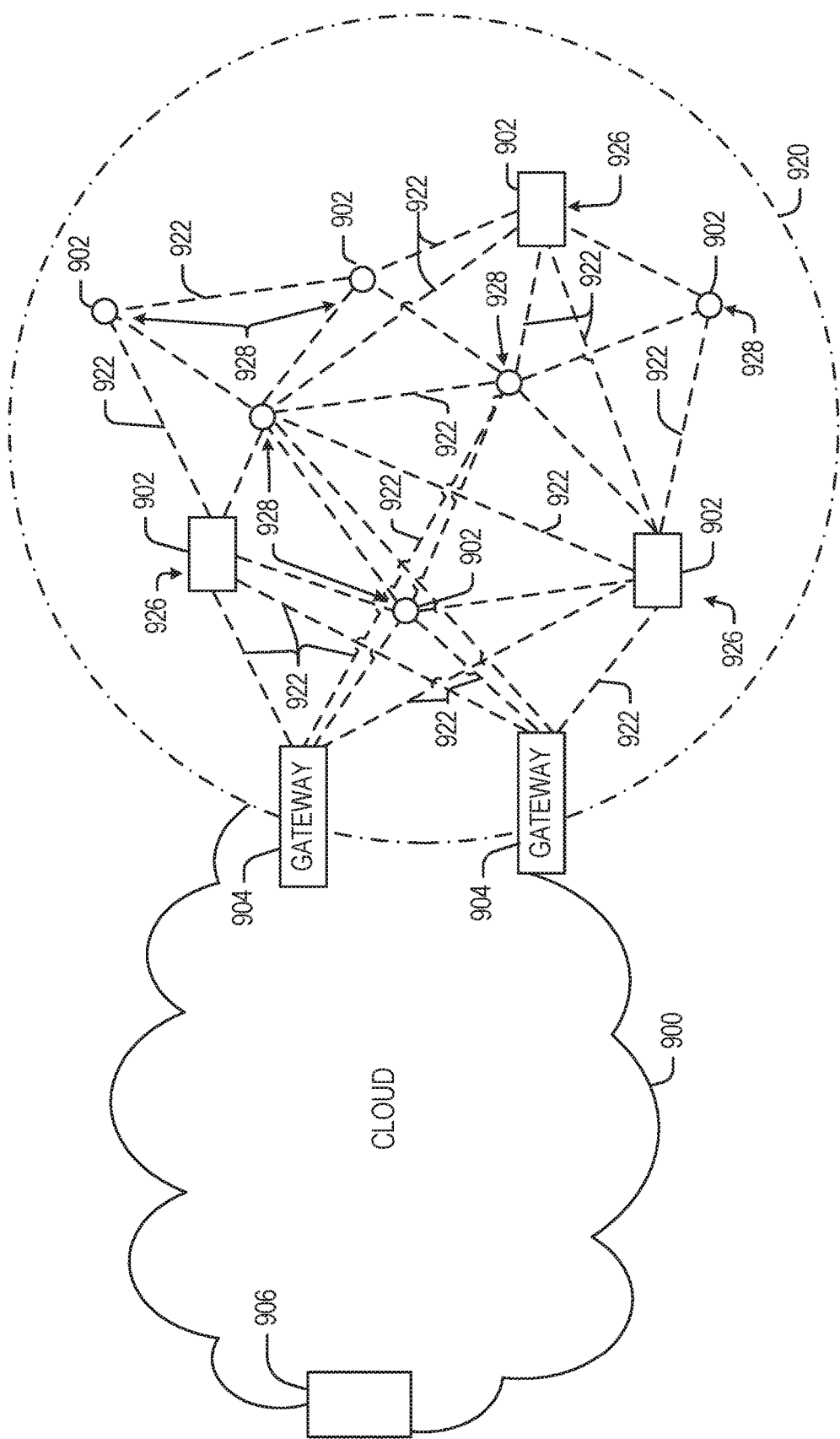

FIG. 9 illustrates a cloud computing network in communication with a mesh network of IoT devices (devices 902) operating as a fog device at the edge of the cloud computing network. The mesh network of IoT devices may be termed a fog 920, operating at the edge of the cloud 900. To simplify the diagram, not every IoT device 902 is labeled.

The fog 920 may be considered to be a massively interconnected network wherein a number of IoT devices 902 are in communications with each other, for example, by radio links 922. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 902 are shown in this example, gateways 904, data aggregators 926, and sensors 928, although any combinations of IoT devices 902 and functionality may be used. The gateways 904 may be edge devices that provide communications between the cloud 900 and the fog 920, and may also provide the backend process function for data obtained from sensors 928, such as motion data, flow data, temperature data, and the like. The data aggregators 926 may collect data from any number of the sensors 928, and perform the back-end processing function for the analysis. The results, raw data, or both may be passed along to the cloud 900 through the gateways 904. The sensors 928 may be full IoT devices 902, for example, capable of both collecting data and processing the data. In some cases, the sensors 928 may be more limited in functionality, for example, collecting the data and allowing the data aggregators 926 or gateways 904 to process the data.

Communications from any IoT device 902 may be passed along a convenient path (e.g., a most convenient path) between any of the IoT devices 902 to reach the gateways 904. In these networks, the number of interconnections provide substantial redundancy, allowing communications to be maintained, even with the loss of a number of IoT devices 902. Further, the use of a mesh network may allow IoT devices 902 that are very low power or located at a distance from infrastructure to be used, as the range to connect to another IoT device 902 may be much less than the range to connect to the gateways 904.

The fog 920 provided from these IoT devices 902 may be presented to devices in the cloud 900, such as a server 906, as a single device located at the edge of the cloud 900, e.g., a fog device. In this example, the alerts coming from the fog device may be sent without being identified as coming from a specific IoT device 902 within the fog 920. In this fashion, the fog 920 may be considered a distributed platform that provides computing and storage resources to perform processing or data-intensive tasks such as data analytics, data aggregation, and machine-learning, among others.

In some examples, the IoT devices 902 may be configured using an imperative programming style, e.g., with each IoT device 902 having a specific function and communication partners. However, the IoT devices 902 forming the fog device may be configured in a declarative programming style, allowing the IoT devices 902 to reconfigure their operations and communications, such as to determine needed resources in response to conditions, queries, and device failures. As an example, a query from a user located at a server 906 about the operations of a subset of equipment monitored by the IoT devices 902 may result in the fog 920 device selecting the IoT devices 902, such as particular sensors 928, needed to answer the query. The data from these sensors 928 may then be aggregated and analyzed by any combination of the sensors 928, data aggregators 926, or gateways 904, before being sent on by the fog 920 device to the server 906 to answer the query. In this example, IoT devices 902 in the fog 920 may select the sensors 928 used based on the query, such as adding data from flow sensors or temperature sensors. Further, if some of the IoT devices 902 are not operational, other IoT devices 902 in the fog 920 device may provide analogous data, if available.

Figure 10:
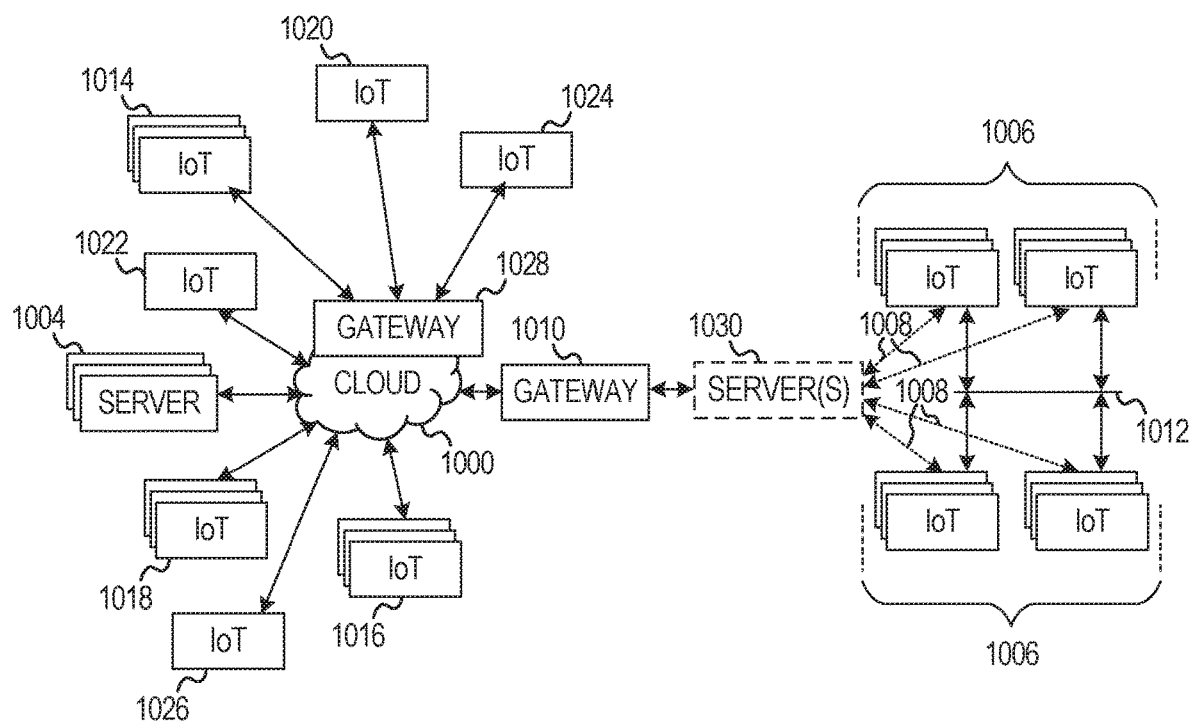

FIG. 10 illustrates a drawing of a cloud computing network, or cloud 1000, in communication with a number of Internet of Things (IoT) devices. The cloud 1000 may represent the Internet, or may be a local area network (LAN), or a wide area network (WAN), such as a proprietary network for a company. The IoT devices may include any number of different types of devices, grouped in various combinations. For example, a traffic control group 1006 may include IoT devices along streets in a city. These IoT devices may include stoplights, traffic flow monitors, cameras, weather sensors, and the like. The traffic control group 1006, or other subgroups, may be in communication with the cloud 1000 through wired or wireless links 1008, such as LPWA links, optical links, and the like. Further, a wired or wireless sub-network 1012 may allow the IoT devices to communicate with each other, such as through a local area network, a wireless local area network, and the like. The IoT devices may use another device, such as a gateway 1010 or 1028 to communicate with remote locations such as the cloud 1000; the IoT devices may also use one or more servers 1030 to facilitate communication with the cloud 1000 or with the gateway 1010. For example, the one or more servers 1030 may operate as an intermediate network node to support a local edge cloud or fog implementation among a local area network. Further, the gateway 1028 that is depicted may operate in a cloud-to-gateway-to-many edge devices configuration, such as with the various IoT devices 1014, 1020, 1024 being constrained or dynamic to an assignment and use of resources in the cloud 1000.

Other example groups of IoT devices may include remote weather stations 1014, local information terminals 1016, alarm systems 1018, automated teller machines 1020, alarm panels 1022, or moving vehicles, such as emergency vehicles 1024 or other vehicles 1026, among many others. Each of these IoT devices may be in communication with other IoT devices, with servers 1004, with another IoT fog device or system (not shown, but depicted in FIG. 9), or a combination therein. The groups of IoT devices may be deployed in various residential, commercial, and industrial settings (including in both private or public environments).

As can be seen from FIG. 10, a large number of IoT devices may be communicating through the cloud 1000. This may allow different IoT devices to request or provide information to other devices autonomously. For example, a group of IoT devices (e.g., the traffic control group 1006) may request a current weather forecast from a group of remote weather stations 1014, which may provide the forecast without human intervention. Further, an emergency vehicle 1024 may be alerted by an automated teller machine 1020 that a burglary is in progress. As the emergency vehicle 1024 proceeds towards the automated teller machine 1020, it may access the traffic control group 1006 to request clearance to the location, for example, by lights turning red to block cross traffic at an intersection in sufficient time for the emergency vehicle 1024 to have unimpeded access to the intersection.

Clusters of IoT devices, such as the remote weather stations 1014 or the traffic control group 1006, may be equipped to communicate with other IoT devices as well as with the cloud 1000. This may allow the IoT devices to form an ad-hoc network between the devices, allowing them to function as a single device, which may be termed a fog device or system (e.g., as described above with reference to FIG. 9).

Figure 11:
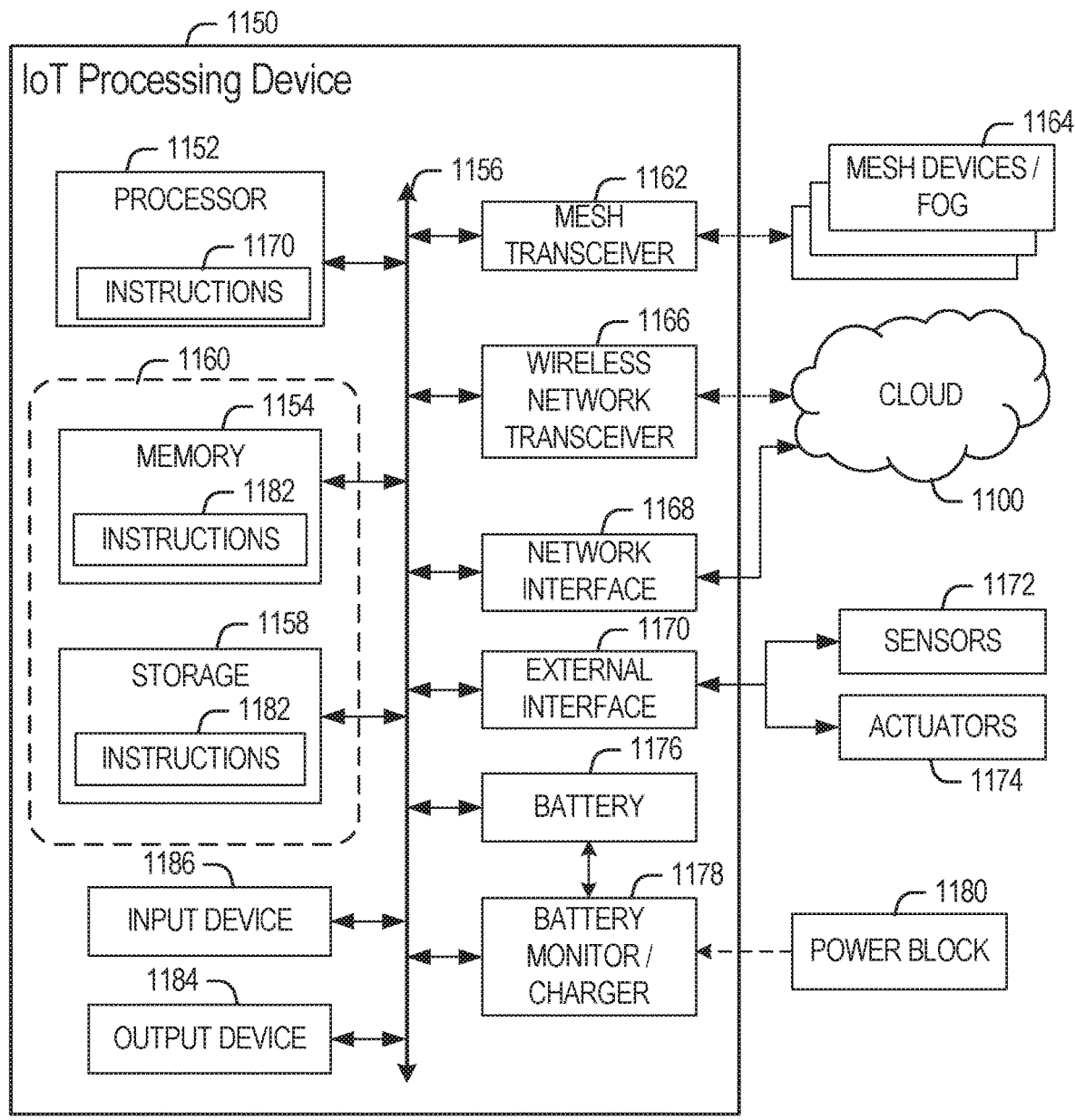

FIG. 11 is a block diagram of an example of components that may be present in an IoT device 1150 for implementing the techniques described herein. The IoT device 1150 may include any combinations of the components shown in the example or referenced in the disclosure above. The components may be implemented as ICs, portions thereof, discrete electronic devices, or other modules, logic, hardware, software, firmware, or a combination thereof adapted in the IoT device 1150, or as components otherwise incorporated within a chassis of a larger system. Additionally, the block diagram of FIG. 11 is intended to depict a high-level view of components of the IoT device 1150. However, some of the components shown may be omitted, additional components may be present, and different arrangement of the components shown may occur in other implementations.

The IoT device 1150 may include a processor 1152, which may be a microprocessor, a multi-core processor, a multi-threaded processor, an ultra-low voltage processor, an embedded processor, or other known processing element. The processor 1152 may be a part of a system on a chip (SoC) in which the processor 1152 and other components are formed into a single integrated circuit, or a single package, such as the Edison™ or Galileo™ SoC boards from Intel. As an example, the processor 1152 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A10 processor from Apple® Inc., a Snapdragon™ processor from Qualcomm® Technologies, Inc., or an OMAP™ processor from Texas Instruments, Inc.

The processor 1152 may communicate with a system memory 1154 over an interconnect 1156 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1158 may also couple to the processor 1152 via the interconnect 1156. In an example, the storage 1158 may be implemented via a solid state disk drive (SSDD). Other devices that may be used for the storage 1158 include flash memory cards, such as SD cards, microSD cards, xD picture cards, and the like, and USB flash drives. In low power implementations, the storage 1158 may be on-die memory or registers associated with the processor 1152. However, in some examples, the storage 1158 may be implemented using a micro hard disk drive (HDD). Further, any number of new technologies may be used for the storage 1158 in addition to, or instead of, the technologies described, such resistance change memories, phase change memories, holographic memories, or chemical memories, among others.

The components may communicate over the interconnect 1156. The interconnect 1156 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1156 may be a proprietary bus, for example, used in a SoC based system. Other bus systems may be included, such as an I2C interface, an SPI interface, point to point interfaces, and a power bus, among others.

The interconnect 1156 may couple the processor 1152 to a mesh transceiver 1162, for communications with other mesh devices 1164. The mesh transceiver 1162 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 1164. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 1162 may communicate using multiple standards or radios for communications at different range. For example, the IoT device 1150 may communicate with close devices, e.g., within about 10 meters, using a local transceiver based on BLE, or another low power radio, to save power. More distant mesh devices 1164, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 1166 may be included to communicate with devices or services in the cloud 1100 via local or wide area network protocols. The wireless network transceiver 1166 may be a LPWA transceiver that follows the IEEE 802.15.4, or IEEE 802.15.4g standards, among others. The IoT device 1150 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 1162 and wireless network transceiver 1166, as described herein. For example, the radio transceivers 1162 and 1166 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 1162 and 1166 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It can be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 1166, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 1168 may be included to provide a wired communication to the cloud 1100 or to other devices, such as the mesh devices 1164. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 1168 may be included to allow connect to a second network, for example, a NIC 1168 providing communications to the cloud over Ethernet, and a second NIC 1168 providing communications to other devices over another type of network.

The interconnect 1156 may couple the processor 1152 to an external interface 1170 that is used to connect external devices or subsystems. The external devices may include sensors 1172, such as accelerometers, level sensors, flow sensors, optical light sensors, camera sensors, temperature sensors, a global positioning system (GPS) sensors, pressure sensors, barometric pressure sensors, and the like. The external interface 1170 further may be used to connect the IoT device 1150 to actuators 1174, such as power switches, valve actuators, an audible sound generator, a visual warning device, and the like.

In some optional examples, various input/output (I/O) devices may be present within, or connected to, the IoT device 1150. For example, a display or other output device 1184 may be included to show information, such as sensor readings or actuator position. An input device 1186, such as a touch screen or keypad may be included to accept input. An output device 1184 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 1150.

A battery 1176 may power the IoT device 1150, although in examples in which the IoT device 1150 is mounted in a fixed location, it may have a power supply coupled to an electrical grid. The battery 1176 may be a lithium ion battery, or a metal-air battery, such as a zinc-air battery, an aluminum-air battery, a lithium-air battery, and the like.

A battery monitor/charger 1178 may be included in the IoT device 1150 to track the state of charge (SoCh) of the battery 1176. The battery monitor/charger 1178 may be used to monitor other parameters of the battery 1176 to provide failure predictions, such as the state of health (SoH) and the state of function (SoF) of the battery 1176. The battery monitor/charger 1178 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 1178 may communicate the information on the battery 1176 to the processor 1152 over the interconnect 1156. The battery monitor/charger 1178 may also include an analog-to-digital (ADC) convertor that allows the processor 1152 to directly monitor the voltage of the battery 1176 or the current flow from the battery 1176. The battery parameters may be used to determine actions that the IoT device 1150 may perform, such as transmission frequency, mesh network operation, sensing frequency, and the like.

A power block 1180, or other power supply coupled to a grid, may be coupled with the battery monitor/charger 1178 to charge the battery 1176. In some examples, the power block 1180 may be replaced with a wireless power receiver to obtain the power wirelessly, for example, through a loop antenna in the IoT device 1150. A wireless battery charging circuit, such as an LTC4020 chip from Linear Technologies of Milpitas, Calif., among others, may be included in the battery monitor/charger 1178. The specific charging circuits chosen depend on the size of the battery 1176, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1158 may include instructions 1182 in the form of software, firmware, or hardware commands to implement the techniques described herein. Although such instructions 1182 are shown as code blocks included in the memory 1154 and the storage 1158, it may be understood that any of the code blocks may be replaced with hardwired circuits, for example, built into an application specific integrated circuit (ASIC).

In an example, the instructions 1182 provided via the memory 1154, the storage 1158, or the processor 1152 may be embodied as a non-transitory, machine readable medium 1160 including code to direct the processor 1152 to perform electronic operations in the IoT device 1150. The processor 1152 may access the non-transitory, machine readable medium 1160 over the interconnect 1156. For instance, the non-transitory, machine readable medium 1160 may include storage units such as optical disks, flash drives, or any number of other hardware devices. The non-transitory, machine readable medium 1160 may include instructions to direct the processor 1152 to perform a specific sequence or flow of actions, for example, as described with respect to the flowchart(s) and diagram(s) of operations and functionality described throughout this disclosure.

Example Computing Architectures

Figure 12:
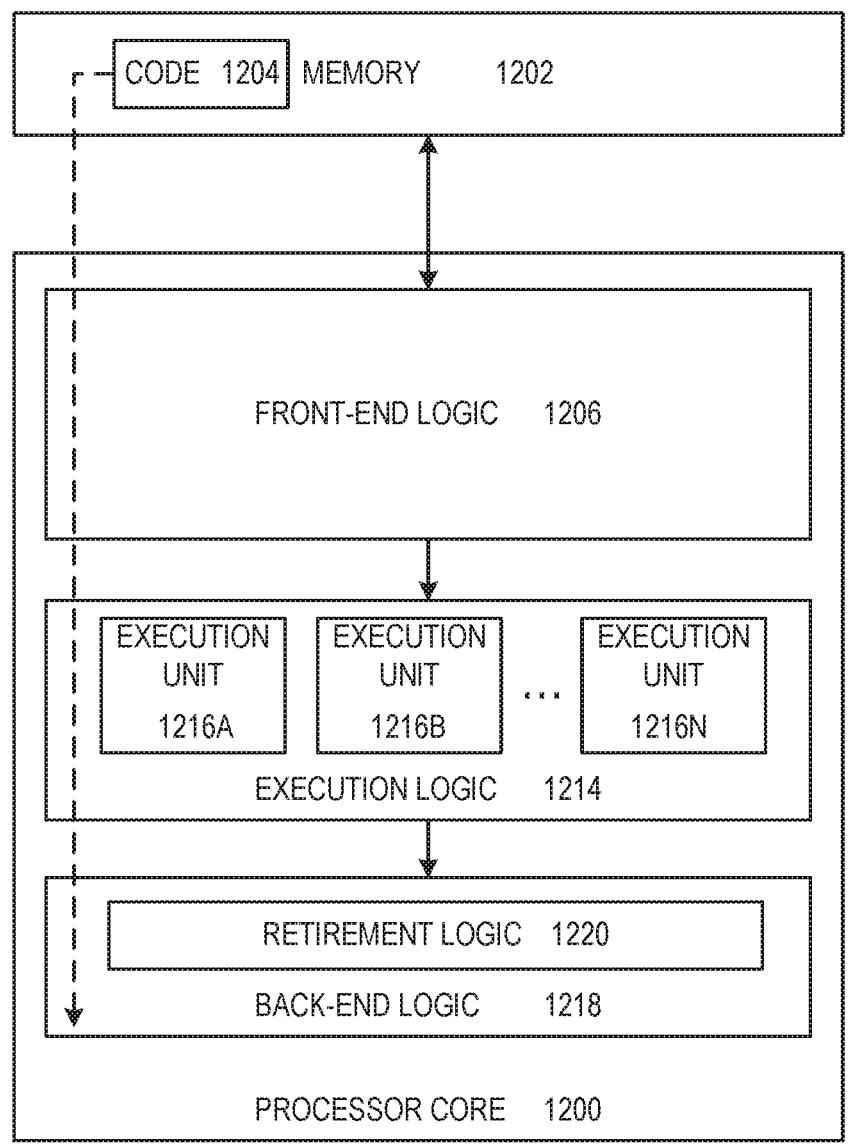
FIGS. 12 and 13 illustrate example computer architectures that can be used in accordance with certain embodiments.
Figure 13:
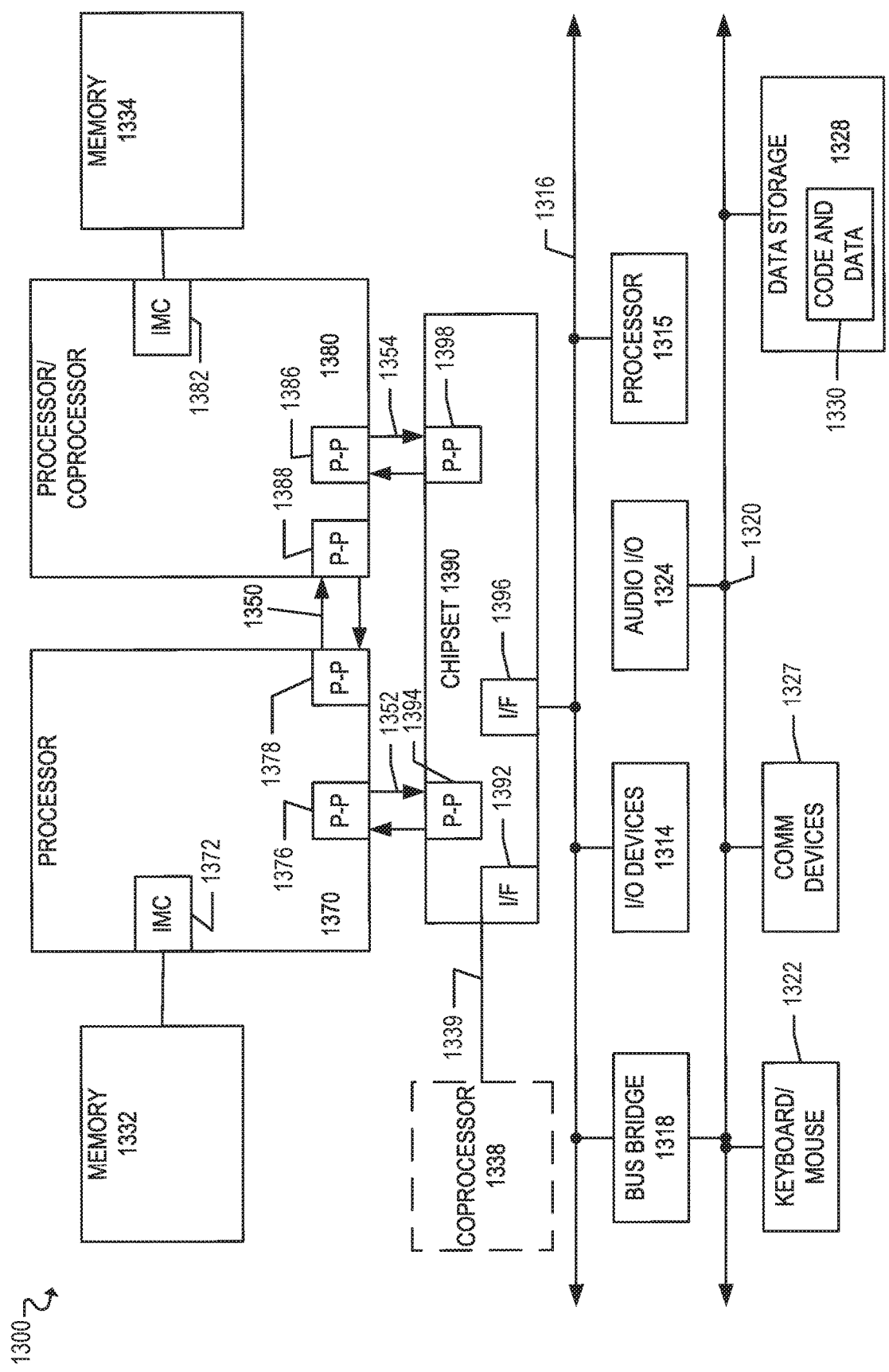

FIGS. 12 and 13 illustrate example computer processor architectures that can be used in accordance with embodiments disclosed herein. For example, in various embodiments, the computer architectures of FIGS. 12 and 13 may be used to implement the visual fog functionality described throughout this disclosure. Other embodiments may use other processor and system designs and configurations known in the art, for example, for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

FIG. 12 illustrates a block diagram for an example embodiment of a processor 1200. Processor 1200 is an example of a type of hardware device that can be used in connection with the embodiments described throughout this disclosure. Processor 1200 may be any type of processor, such as a microprocessor, an embedded processor, a digital signal processor (DSP), a network processor, a multi-core processor, a single core processor, or other device to execute code. Although only one processor 1200 is illustrated in FIG. 12, a processing element may alternatively include more than one of processor 1200 illustrated in FIG. 12. Processor 1200 may be a single-threaded core or, for at least one embodiment, the processor 1200 may be multithreaded in that it may include more than one hardware thread context (or "logical processor") per core.

FIG. 12 also illustrates a memory 1202 coupled to processor 1200 in accordance with an embodiment. Memory 1202 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1200 can execute any type of instructions associated with algorithms, processes, or operations detailed herein. Generally, processor 1200 can transform an element or an article (e.g., data) from one state or thing to another state or thing.

Code 1204, which may be one or more instructions to be executed by processor 1200, may be stored in memory 1202, or may be stored in software, hardware, firmware, or any suitable combination thereof, or in any other internal or external component, device, element, or object where appropriate and based on particular needs. In one example, processor 1200 can follow a program sequence of instructions indicated by code 1204. Each instruction enters a front-end logic 1206 and is processed by one or more decoders 1208. The decoder may generate, as its output, a micro operation such as a fixed width micro operation in a predefined format, or may generate other instructions, microinstructions, or control signals that reflect the original code instruction. Front-end logic 1206 may also include register renaming logic and scheduling logic, which generally allocate resources and queue the operation corresponding to the instruction for execution.

Processor 1200 can also include execution logic 1214 having a set of execution units 1216a, 1216b, 1216n, etc. Some embodiments may include a number of execution units dedicated to specific functions or sets of functions. Other embodiments may include only one execution unit or one execution unit that can perform a particular function. Execution logic 1214 performs the operations specified by code instructions.

After completion of execution of the operations specified by the code instructions, back-end logic 1218 can retire the instructions of code 1204. In one embodiment, processor 1200 allows out of order execution but requires in order retirement of instructions. Retirement logic 1220 may take a variety of known forms (e.g., re-order buffers or the like).

In this manner, processor 1200 is transformed during execution of code 1204, at least in terms of the output generated by the decoder, hardware registers and tables utilized by register renaming logic 1210, and any registers (not shown) modified by execution logic 1214.

Although not shown in FIG. 12, a processing element may include other elements on a chip with processor 1200. For example, a processing element may include memory control logic along with processor 1200. The processing element may include I/O control logic and/or may include I/O control logic integrated with memory control logic. The processing element may also include one or more caches. In some embodiments, non-volatile memory (such as flash memory or fuses) may also be included on the chip with processor 1200.

FIG. 13 illustrates a block diagram for an example embodiment of a multiprocessor 1300. As shown in FIG. 13, multiprocessor system 1300 is a point-to-point interconnect system, and includes a first processor 1370 and a second processor 1380 coupled via a point-to-point interconnect 1350. In some embodiments, each of processors 1370 and 1380 may be some version of processor 1200 of FIG. 12.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, matrix processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of this disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), matrix processors, field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

All or part of any component of FIG. 13 may be implemented as a separate or stand-alone component or chip, or may be integrated with other components or chips, such as a system-on-a-chip (SoC) that integrates various computer components into a single chip.

Embodiments of the mechanisms disclosed herein may be implemented in hardware, software, firmware, or a combination of such implementation approaches. Certain embodiments may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of this disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

The flowcharts and block diagrams in the FIGURES illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or alternative orders, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The foregoing disclosure outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including a central processing unit (CPU) package. An SoC represents an integrated circuit (IC) that integrates components of a computer or other electronic system into a single chip. The SoC may contain digital, analog, mixed-signal, and radio frequency functions, all of which may be provided on a single chip substrate. Other embodiments may include a multi-chip-module (MCM), with a plurality of chips located within a single electronic package and configured to interact closely with each other through the electronic package. In various other embodiments, the computing functionalities disclosed herein may be implemented in one or more silicon cores in Application Specific Integrated Circuits (ASICs), Field Programmable Gate Arrays (FPGAs), and other semiconductor chips.

As used throughout this specification, the term "processor" or "microprocessor" should be understood to include not only a traditional microprocessor (such as Intel's° industry-leading x86 and x64 architectures), but also graphics processors, matrix processors, and any ASIC, FPGA, microcontroller, digital signal processor (DSP), programmable logic device, programmable logic array (PLA), microcode, instruction set, emulated or virtual machine processor, or any similar "Turing-complete" device, combination of devices, or logic elements (hardware or software) that permit the execution of instructions.

Note also that in certain embodiments, some of the components may be omitted or consolidated. In a general sense, the arrangements depicted in the figures should be understood as logical divisions, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute instructions associated with data or microcode to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

In operation, a storage may store information in any suitable type of tangible, non-transitory storage medium (for example, random access memory (RAM), read only memory (ROM), field programmable gate array (FPGA), erasable programmable read only memory (EPROM), electrically erasable programmable ROM (EEPROM), or microcode), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein should be construed as being encompassed within the broad terms 'memory' and 'storage,' as appropriate. A non-transitory storage medium herein is expressly intended to include any non-transitory special-purpose or programmable hardware configured to provide the disclosed operations, or to cause a processor to perform the disclosed operations. A non-transitory storage medium also expressly includes a processor having stored thereon hardware-coded instructions, and optionally microcode instructions or sequences encoded in hardware, firmware, or software.

Computer program logic implementing all or part of the functionality described herein is embodied in various forms, including, but in no way limited to, hardware description language, a source code form, a computer executable form, machine instructions or microcode, programmable hardware, and various intermediate forms (for example, forms generated by an HDL processor, assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL.

The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processor and memory can be suitably coupled to the board based on particular configuration needs, processing demands, and computing designs. Other components such as external storage, additional sensors, controllers for audio/video display, and peripheral devices may be attached to the board as plug-in cards, via cables, or integrated into the board itself. In another example, the electrical circuits of the FIGURES may be implemented as stand-alone modules (e.g., a device with associated components and circuitry configured to perform a specific application or function) or implemented as plug-in modules into application specific hardware of electronic devices.

Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims.

Example Implementations

The following examples pertain to embodiments described throughout this disclosure.

One or more embodiments may include an apparatus, comprising: a display interface to communicate with a display device; and a processor to: identify a mobile transaction associated with a user, wherein the mobile transaction comprises a potential transaction to be completed using a mobile device of the user; access transaction data associated with the mobile transaction; encrypt the transaction data based on an encryption key associated with the user, wherein encrypting the transaction data causes encrypted transaction data to be generated; generate a visual code associated with the encrypted transaction data, wherein the visual code comprises visually encoded data, and wherein the visual code is generated within a protected execution environment of the processor; establish a protected datapath between the processor and the display device, wherein the protected datapath is established via the display interface; and transmit the visual code to the display device via the protected datapath, wherein the visual code is to be displayed on the display device.

In one example embodiment of an apparatus, the visual code comprises a quick response (QR) code.

In one example embodiment of an apparatus, the protected execution environment comprises a trusted execution environment (TEE).

In one example embodiment of an apparatus: the processor to establish the protected datapath between the processor and the display device is further to: establish a second encryption key associated with the protected datapath, wherein transmissions between the processor and the display device via the display interface are to be encrypted based on the second encryption key; and the processor to transmit the visual code to the display device via the protected datapath is further to: encrypt the visual code based on the second encryption key, wherein encrypting the visual code causes an encrypted visual code to be generated; and transmit the encrypted visual code to the display device via the protected datapath.

In one example embodiment of an apparatus: the potential transaction comprises a purchase of one or more products; and the transaction data comprises data associated with purchasing the one or more products.

In one example embodiment of an apparatus: the potential transaction is associated with an advertisement for the one or more products; and the processor is further to cause the advertisement to be displayed on the display device.

In one example embodiment of an apparatus, the processor to generate the visual code associated with the encrypted transaction data is further to: store the encrypted transaction data at a network location, wherein the encrypted transaction data is accessible by the mobile device via a uniform resource locator (URL) associated with the network location; and encode the URL into the visual code.

In one example embodiment of an apparatus, the processor is further to detect the user within a proximity of the display device, wherein the user is detected based on visual data captured by one or more vision sensors.

In one example embodiment of an apparatus, the processor is further to obtain the encryption key associated with the user from the mobile device.

One or more embodiments may include a system, comprising: one or more vision sensors to capture visual data associated with an environment; a display device; and one or more processing devices to: detect a user within a proximity of the display device, wherein the user is detected based on the visual data captured by the one or more vision sensors; identify a mobile transaction associated with the user, wherein the mobile transaction comprises a potential transaction to be completed using a mobile device of the user; access transaction data associated with the mobile transaction; encrypt the transaction data based on an encryption key associated with the user, wherein encrypting the transaction data causes encrypted transaction data to be generated; generate a visual code associated with the encrypted transaction data, wherein the visual code comprises visually encoded data, and wherein the visual code is generated within a protected execution environment of the one or more processing devices; establish a protected datapath between the one or more processing devices and the display device; and transmit the visual code to the display device via the protected datapath, wherein the visual code is to be displayed on the display device.

In one example embodiment of a system: the one or more vision sensors are further to scan a second visual code displayed on the mobile device of the user, wherein the second visual code comprises a visual encoding of the encryption key associated with the user; and the one or more processing devices are further to decode the second visual code to obtain the encryption key associated with the user.

In one example embodiment of a system, the visual code comprises a quick response (QR) code.

In one example embodiment of a system: the one or more processing devices to establish the protected datapath between the one or more processing devices and the display device are further to: establish a second encryption key associated with the protected datapath, wherein transmissions between the one or more processing devices and the display device are to be encrypted based on the second encryption key; and the one or more processing devices to transmit the visual code to the display device via the protected datapath is further to: encrypt the visual code based on the second encryption key, wherein encrypting the visual code causes an encrypted visual code to be generated; and transmit the encrypted visual code to the display device via the protected datapath.

In one example embodiment of a system: the potential transaction comprises a purchase of one or more products; and the transaction data comprises data associated with purchasing the one or more products.

In one example embodiment of a system, the one or more processing devices are further to: detect the one or more products in a shopping cart of the user, wherein the one or more products are detected based on the visual data captured by the one or more vision sensors.

In one example embodiment of a system: the potential transaction is associated with an advertisement for the one or more products; and the one or more processing devices are further to cause the advertisement to be displayed on the display device.

In one example embodiment of a system, the one or more processing devices are further to: detect a shopper context associated with the user, wherein the shopper context is detected based at least in part on the visual data captured by the one or more vision sensors, and wherein the shopper context comprises one or more of: identity of the user; demography of the user; purchase history of the user; current position of the user within a retail environment; or current contents of a shopping cart associated with the user; and select the advertisement based on the shopper context.

In one example embodiment of a system, the one or more processing devices to generate the visual code associated with the encrypted transaction data are further to: store the encrypted transaction data at a network location, wherein the encrypted transaction data is accessible by the mobile device via a uniform resource locator (URL) associated with the network location; and encode the URL into the visual code.

One or more embodiments may include at least one machine accessible storage medium having instructions stored thereon, wherein the instructions, when executed on a machine, cause the machine to: detect a user within a proximity of a display device, wherein the user is detected based on visual data captured by one or more vision sensors; identify a mobile transaction associated with the user, wherein the mobile transaction comprises a potential transaction to be completed using a mobile device of the user; access transaction data associated with the mobile transaction; encrypt the transaction data based on an encryption key associated with the user, wherein encrypting the transaction data causes encrypted transaction data to be generated; generate a visual code associated with the encrypted transaction data, wherein the visual code comprises visually encoded data, and wherein the visual code is generated within a protected execution environment of a processor; establish a protected datapath between the processor and the display device; and transmit the visual code to the display device via the protected datapath, wherein the visual code is to be displayed on the display device.

In one example embodiment of a storage medium: the instructions that cause the machine to establish the protected datapath between the processor and the display device further cause the machine to: establish a second encryption key associated with the protected datapath, wherein transmissions between the processor and the display device are to be encrypted based on the second encryption key; and the instructions that cause the machine to transmit the visual code to the display device via the protected datapath further cause the machine to: encrypt the visual code based on the second encryption key, wherein encrypting the visual code causes an encrypted visual code to be generated; and transmit the encrypted visual code to the display device via the protected datapath.

In one example embodiment of a storage medium: the potential transaction is associated with an advertisement for one or more products; and the instructions further cause the machine to: detect a shopper context associated with the user, wherein the shopper context is detected based at least in part on the visual data captured by the one or more vision sensors, and wherein the shopper context comprises one or more of: identity of the user; demography of the user; purchase history of the user; current position of the user within a retail environment; or current contents of a shopping cart associated with the user; select the advertisement based on the shopper context; and cause the advertisement to be displayed on the display device.

In one example embodiment of a storage medium, the instructions that cause the machine to generate the visual code associated with the encrypted transaction data further cause the machine to: store the encrypted transaction data at a network location, wherein the encrypted transaction data is accessible by the mobile device via a uniform resource locator (URL) associated with the network location; and encode the URL into the visual code.

One or more embodiments may include a method, comprising: detecting a user within a proximity of a display device, wherein the user is detected based on visual data captured by one or more vision sensors; identifying a mobile transaction associated with the user, wherein the mobile transaction comprises a potential transaction to be completed using a mobile device of the user; accessing transaction data associated with the mobile transaction; encrypting the transaction data based on an encryption key associated with the user, wherein encrypting the transaction data causes encrypted transaction data to be generated; generating a visual code associated with the encrypted transaction data, wherein the visual code comprises visually encoded data, and wherein the visual code is generated within a protected execution environment of a processor; establishing a protected datapath between the processor and the display device; and transmitting the visual code to the display device via the protected datapath, wherein the visual code is to be displayed on the display device.

In one example embodiment of a method, the potential transaction is associated with an advertisement for one or more products, and wherein the method further comprises: detecting a shopper context associated with the user, wherein the shopper context is detected based at least in part on the visual data captured by the one or more vision sensors, and wherein the shopper context comprises one or more of: identity of the user; demography of the user; purchase history of the user; current position of the user within a retail environment; or current contents of a shopping cart associated with the user; selecting the advertisement based on the shopper context; and causing the advertisement to be displayed on the display device.

In one example embodiment of a method, generating the visual code associated with the encrypted transaction data comprises: storing the encrypted transaction data at a network location, wherein the encrypted transaction data is accessible by the mobile device via a uniform resource locator (URL) associated with the network location; and encoding the URL into the visual code.

What is claimed is:

1. A computing device for secure mobile transactions, comprising:
   an input/output (I/O) interface communicatively coupling processing circuitry and display engine circuitry of the computing device;
   the processing circuitry configured to:
      decode a first visual code to obtain a user encryption key of a user, wherein the user encryption key is encoded within the first visual code;
      encrypt, based on the user encryption key, transaction data for performing a mobile transaction on a mobile device of the user, wherein the transaction data is encrypted into encrypted transaction data;
      generate, within a protected execution environment, a second visual code, wherein the encrypted transaction data is encoded within the second visual code;
      encrypt, within the protected execution environment, the second visual code, wherein the second visual code is encrypted into an encrypted visual code based on a display encryption key; and
      transmit, via the I/O interface, the encrypted visual code to the display engine circuitry; and
   the display engine circuitry configured to:
      receive, via the I/O interface, the encrypted visual code from the processing circuitry;
      decrypt the encrypted visual code based on the display encryption key, wherein the encrypted visual code is decrypted into the second visual code; and
      cause the second visual code to be displayed on a display device.

2. The computing device of claim 1, wherein the first visual code or the second visual code comprises a quick response (QR) code.

3. The computing device of claim 1, wherein the protected execution environment comprises a trusted execution environment (TEE).

4. The computing device of claim 1, wherein:
   the mobile transaction is a transaction to purchase one or more products; and
   the transaction data comprises data associated with purchasing the one or more products.

5. The computing device of claim 4, wherein:
   the mobile transaction is associated with an advertisement for the one or more products; and
   the processing circuitry is further configured to cause the advertisement to be displayed on the display device.

6. The computing device of claim 1, wherein the processing circuitry configured to generate, within the protected execution environment, the second visual code is further configured to:
   store the encrypted transaction data at a network location, wherein the encrypted transaction data is accessible by the mobile device via a uniform resource locator (URL) associated with the network location; and
   encode the URL into the second visual code.

7. The computing device of claim 1, wherein the processing circuitry is further configured to detect the user within a proximity of the display device, wherein the user is detected based on visual data captured by one or more vision sensors.

8. The computing device of claim 7, wherein the processing circuitry to decode the first visual code to obtain the user encryption key of the user is further configured to:
   obtain the first visual code from one or more vision sensors, wherein the one or more vision sensors capture the first visual code from a display of the mobile device of the user.

9. The computing device of claim 1, wherein the display engine circuitry comprises a key register to store the display encryption key.

10. A system for secure mobile transactions, comprising:
    a display device;
    processing circuitry configured to:
       obtain visual data captured by one or more vision sensors;
       detect, based on the visual data, a user within a proximity of the display device;
       capture, via the one or more vision sensors, a first visual code displayed on a mobile device of the user;
       decode the first visual code to obtain a user encryption key of the user, wherein the user encryption key is encoded within the first visual code;
       encrypt, based on the user encryption key, transaction data for performing a mobile transaction on the mobile device of the user, wherein the transaction data is encrypted into encrypted transaction data;
       generate, within a protected execution environment, a second visual code, wherein the encrypted transaction data is encoded within the second visual code;
       encrypt, within the protected execution environment, the second visual code, wherein the second visual code is encrypted into an encrypted visual code based on a display encryption key; and
       transmit the encrypted visual code to the display engine circuitry; and
    the display engine circuitry configured to:
       receive the encrypted visual code from the processing circuitry;
       decrypt the encrypted visual code based on the display encryption key, wherein the encrypted visual code is decrypted into the second visual code; and
       cause the second visual code to be displayed on the display device.

11. The system of claim 10, wherein the first visual code or the second visual code comprises a quick response (QR) code.

12. The system of claim 10, wherein:
    the transaction comprises a purchase of one or more products; and
    the transaction data comprises data associated with purchasing the one or more products.

13. The system of claim 12, wherein the processing circuitry is further configured to:
    detect the one or more products in a shopping cart of the user, wherein the one or more products are detected based on the visual data captured by the one or more vision sensors.
14. The system of claim 12, wherein:
    the transaction is associated with an advertisement for the one or more products; and
    the processing circuitry is further configured to cause the advertisement to be displayed on the display device.
15. The system of claim 14, wherein the processing circuitry is further configured to:
    detect a shopper context associated with the user, wherein the shopper context is detected based at least in part on the visual data captured by the one or more vision sensors, and wherein the shopper context comprises one or more of:
        identity of the user;
        demography of the user;
        purchase history of the user;
        current position of the user within a retail environment; or
        current contents of a shopping cart associated with the user; and
    select the advertisement based on the shopper context.
16. The system of claim 10, wherein the processing circuitry configured to generate, within the protected execution environment, the second visual code is further configured to:
    store the encrypted transaction data at a network location, wherein the encrypted transaction data is accessible by the mobile device via a uniform resource locator (URL) associated with the network location; and
    encode the URL into the second visual code.
17. At least one non-transitory computer-readable storage medium having instructions stored thereon, the instructions executable on a computing device comprising a processor and a display engine, wherein when executed:
    the instructions cause the processor to:
        decode a first visual code to obtain a user encryption key of a user, wherein the user encryption key is encoded within the first visual code;
        encrypt, based on the user encryption key, transaction data for performing a mobile transaction on a mobile device of the user, wherein the transaction data is encrypted into encrypted transaction data;
        generate, within a protected execution environment, a second visual code, wherein the encrypted transaction data is encoded within the second visual code;
        encrypt, within the protected execution environment, the second visual code, wherein the second visual code is encrypted into an encrypted visual code based on a display encryption key; and
        transmit, via an input/output (I/O) interface of the computing device, the encrypted visual code to the display engine; and
    the instructions cause the display engine to:
        receive, via the I/O interface, the encrypted visual code from the processor;
        decrypt the encrypted visual code based on the display encryption key, wherein the encrypted visual code is decrypted into the second visual code; and
        cause the second visual code to be displayed on a display device.
18. The storage medium of claim 17, wherein the instructions further cause the processor to:
    obtain visual data captured by one or more vision sensors; and
    determine, based on the visual data, that the user is within a proximity of the display device.
19. The storage medium of claim 18, wherein:
    the mobile transaction is associated with an advertisement for one or more products; and
    the instructions further cause the processor to:
        detect a shopper context associated with the user, wherein the shopper context is detected based at least in part on the visual data captured by the one or more vision sensors, and wherein the shopper context comprises one or more of:
            identity of the user;
            demography of the user;
            purchase history of the user;
            current position of the user within a retail environment; or
            current contents of a shopping cart associated with the user;
        select the advertisement based on the shopper context; and
        cause the advertisement to be displayed on the display device.
20. The storage medium of claim 17, wherein the instructions that cause the processor to generate, within the protected execution environment, the second visual code further cause the processor to:
    store the encrypted transaction data at a network location, wherein the encrypted transaction data is accessible by the mobile device via a uniform resource locator (URL) associated with the network location; and
    encode the URL into the second visual code.
21. A method for performing secure mobile transactions, wherein the method is performed on a processor of a computing device, wherein the computing device comprises the processor, a display engine, and an input/output (I/O) interface, wherein the method comprises:
    detecting, based on visual data captured by one or more vision sensors, a user within a proximity of a display device;
    capturing, via the one or more vision sensors, a first visual code displayed on a mobile device of the user;
    decoding the first visual code to obtain a user encryption key of the user, wherein the user encryption key is encoded within the first visual code;
    encrypting, based on the user encryption key, transaction data for performing a mobile transaction on the mobile device of the user, wherein the transaction data is encrypted into encrypted transaction data;
    generating, within a protected execution environment, a second visual code, wherein the encrypted transaction data is encoded within the second visual code;
    encrypting, within the protected execution environment, the second visual code, wherein the second visual code is encrypted into an encrypted visual code based on a display encryption key; and
    transmitting, via the I/O interface, the encrypted visual code to the display engine, wherein the display engine is to decrypt the encrypted visual code into the second visual code and cause the second visual code to be displayed on the display device.
22. The method of claim 21, wherein the mobile transaction is associated with an advertisement for one or more products, and wherein the method further comprises:
    detecting a shopper context associated with the user, wherein the shopper context is detected based at least in part on the visual data captured by the one or more vision sensors, and wherein the shopper context comprises one or more of:
identity of the user;
demography of the user;
purchase history of the user;
current position of the user within a retail environment; or
current contents of a shopping cart associated with the user;
selecting the advertisement based on the shopper context; and
causing the advertisement to be displayed on the display device.

23. The method of claim 21, wherein generating, within the protected execution environment, the second visual code comprises:
storing the encrypted transaction data at a network location, wherein the encrypted transaction data is accessible by the mobile device via a uniform resource locator (URL) associated with the network location; and
encoding the URL into the second visual code.

\* \* \* \* \*